United States Patent
Koyama et al.

(10) Patent No.: US 8,472,215 B2
(45) Date of Patent: Jun. 25, 2013

(54) GRID-TIE INVERTER FOR INTERCONNECTING AC VOLTAGE TO ELECTRIC POWER GRID

(75) Inventors: Yushi Koyama, Fuchu (JP); Junichi Tsuda, Inagi (JP); Hiroshi Mochikawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/547,552

(22) Filed: Jul. 12, 2012

(65) Prior Publication Data

US 2012/0275201 A1  Nov. 1, 2012

Related U.S. Application Data

(63) Continuation of application No. PCT/JP2011/050421, filed on Jan. 13, 2011.

(30) Foreign Application Priority Data

Jan. 13, 2010 (JP) .................................. 2010-004897
Apr. 6, 2010 (JP) .................................. 2010-087546

(51) Int. Cl.
*H02M 1/12* (2006.01)
*H02M 1/14* (2006.01)
*H02M 7/537* (2006.01)

(52) U.S. Cl.
USPC ................. 363/40; 363/39; 363/41; 363/131; 363/132

(58) Field of Classification Search
USPC ................. 363/39, 40, 41, 131, 132
See application file for complete search history.

(56) References Cited

U.S. PATENT DOCUMENTS

| | | | |
|---|---|---|---|
| 5,831,842 A * | 11/1998 | Ogasawara et al. | 363/40 |
| 6,452,819 B1 * | 9/2002 | Wobben | 363/40 |
| 7,173,832 B2 * | 2/2007 | Wu | 363/40 |
| 7,274,576 B1 * | 9/2007 | Zargari et al. | 363/39 |

(Continued)

FOREIGN PATENT DOCUMENTS

| | | |
|---|---|---|
| JP | 07-087753 A | 3/1995 |
| JP | 2000-224862 A | 8/2000 |

(Continued)

OTHER PUBLICATIONS

Y. Koyama, U.S. PTO Office Action, U.S. Appl. No. 13/127,641, dated Nov. 23, 2012, 8 pages.

(Continued)

*Primary Examiner* — Bao Q Vu
(74) *Attorney, Agent, or Firm* — Foley & Lardner LLP

(57) ABSTRACT

According to one embodiment, a grid-tie inverter includes: a inverter performing pulse width modulation for a DC voltage; a first capacitor circuit connected to an input side of the inverter so as to form a neutral point; a second capacitor circuit connected to an output side of the inverter so as to form a neutral point; a common mode current bypass channel formed by connecting the neutral points of the first capacitor circuit and the second capacitor circuit; a grounded capacitor provided between the bypass channel and a ground; a first common mode choke coil unit including a common mode choke coil at least one of between the first capacitor circuit and the inverter and between the inverter and the second capacitor circuit; and an output filter converting a pulse width-modulated voltage outputted from the inverter into a sine AC voltage.

16 Claims, 20 Drawing Sheets

U.S. PATENT DOCUMENTS

| | | | |
|---|---|---|---|
| 2005/0174812 A1* | 8/2005 | Wu | 363/39 |
| 2007/0211501 A1* | 9/2007 | Zargari et al. | 363/39 |
| 2011/0216568 A1* | 9/2011 | Koyama et al. | 363/132 |

FOREIGN PATENT DOCUMENTS

| | | |
|---|---|---|
| JP | 2001-069762 A | 3/2001 |
| JP | 2001-204136 A | 7/2001 |
| JP | 2002-218656 A | 8/2002 |
| JP | 2005-204438 A | 7/2005 |
| JP | 3805953 B2 | 8/2006 |
| JP | 2007-068311 A | 3/2007 |
| JP | 2007-336743 A | 12/2007 |
| JP | 2009-148078 A | 7/2009 |
| JP | 2009-148162 A | 7/2009 |
| JP | 2010-119188 A | 5/2010 |
| WO | WO 2009/013996 A1 | 1/2009 |

OTHER PUBLICATIONS

"Power Electronics Circuit", edited by The Semiconductor Power Conversion System Investigation Expert Committee, The Institute of Electrical Engineers of Japan Ohmsha, Ltd., Nov. 30, 2000, p. 206.

Y. Koyama, U.S. PTO Notice of Allowance, U.S. Appl. No. 13/127,641, dated Apr. 23, 2013, 8 pages.

* cited by examiner (a) BOOSTER CIRCUIT (b) INVERTER

GRID-TIE INVERTER FOR INTERCONNECTING AC VOLTAGE TO ELECTRIC POWER GRID

CROSS-REFERENCE TO RELATED APPLICATION

This application is a Continuation of PCT Application No. PCT/JP2011/050421, filed on Jan. 13, 2011, and claims the priority of Japanese Patent Applications No. 2010-004897, filed on Jan. 13, 2010, and No. 2010-087546, filed on Apr. 6, 2010; the entire contents of all of which are incorporated herein by reference.

FIELD

Embodiments described herein relate generally to a grid-tie inverter, which converts, into an AC voltage, a DC voltage supplied from a DC power supply, and interconnects the AC voltage to an electric power grid of an electric power utility.

BACKGROUND

In recent years, in a grid-tie inverter, which converts, into an AC voltage, a DC voltage supplied from a DC power supply such as a photovoltaic power generation system and a fuel cell, and interconnects the AC voltage to an electric power grid, implementation of higher frequency switching has advanced, and following this, harmonic leakage current and electro-magnetic interference (EMI) have become problems. It is apprehended that the leakage current and the EMI may affect control of the inverter and other instruments, and that an earth leakage circuit breaker may be caused to malfunction. In Japan, a tolerance of the leakage current is prescribed by the Electrical Appliance and Material Safety Law, and the EMI is prescribed by the Voluntary Control Council for Information Technology Equipment (VCCI), and the like. In particular, with regard to the EMI, in recent years, moves toward tightening of regulations therefor have been being accelerated.

In the photovoltaic power generation system, a stray capacitance exists between a solar cell panel and a frame of the solar cell panel, the frame connected to the ground, and it is possible that the stray capacitance can be a route of a high frequency common mode noise. In general, on a surface of the solar cell panel, an insulating layer composed of a glass plate is formed. Such a glass plate has a large plane, and accordingly, when the glass plate gets wet with rain, the stray capacitance between the solar cell panel and the frame is increased, and a high frequency common mode current is also increased. Variations of a high frequency voltage occur in the event where the inverter converts the DC voltage to the AC voltage by switching of a semiconductor element. Therefore, in the inverter, the leakage current and the high frequency noise are inevitable problems.

As general methods for suppressing the leakage current and the high frequency noise, there have been known: a method of isolating the grid-tie inverter and the electric power grid from each other using an isolation transformer; a method using a common mode choke coil that suppresses the common mode current; a method of bypassing the common mode current to an input side or the ground by a filter; a method of outputting voltages with reverse polarities to upper and lower arms while using two-level pulse width modulation (PWM) as a control method of the inverter; a method of composing, in the inverter, a bypass channel of which impedance becomes low for the high frequency common mode current, thereby preventing the leakage current and the high frequency noise from flowing outside; a method in which these methods are combined with one another; and the like.

BRIEF DESCRIPTION OF THE DRAWINGS

FIG. 9(a) is a timing chart of a booster circuit; and FIG. 9(b) is a timing chart of an inverter.

FIG. 10(a) is a timing chart when a delay of a carrier is 0 degree; and FIG. 10(b) is a timing chart when the delay of the carrier is 180 degrees.

DETAILED DESCRIPTION

According to one embodiment, a grid-tie inverter includes: a single-phase or three-phase inverter that performs pulse width modulation for a DC voltage supplied from a DC power supply; a first capacitor circuit connected to an input side of the inverter so as to form a neutral point; a second capacitor circuit connected to an output side of the inverter so as to form a neutral point; a common mode current bypass channel formed by connecting the neutral point of the first capacitor circuit and the neutral point of the second capacitor circuit to each other; a grounded capacitor provided between the bypass channel and a ground; a first common mode choke coil unit that includes a common mode choke coil at least one of between the first capacitor circuit and the inverter and between the inverter and the second capacitor circuit, and suppresses a common mode current occurring in the inverter; and an output filter converting a pulse width-modulated voltage waveform outputted from the inverter into a sine single-phase or three-phase AC voltage.

Various Embodiments will be described hereinafter with reference to the accompanying drawings.

Embodiment 1

Figure 1:
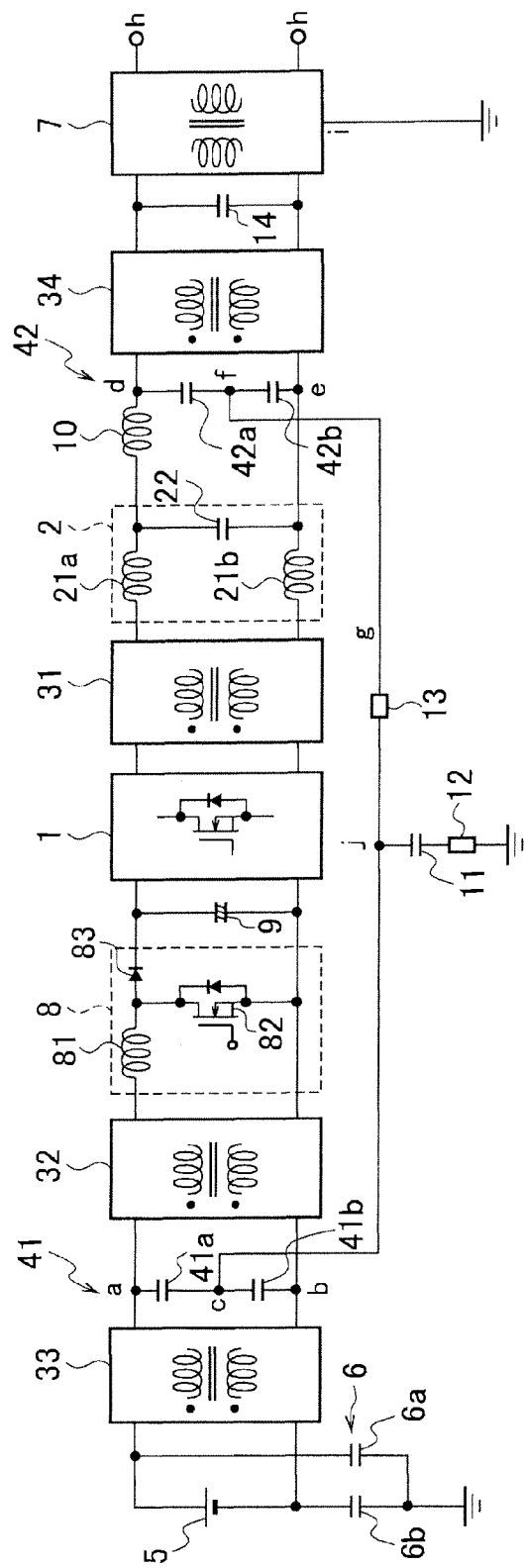
FIG. 1 is a block diagram illustrating a configuration of a grid-tie inverter according to Embodiment 1.

As illustrated in FIG. 1, a grid-tie inverter according to Embodiment 1 is a single-phase grid-tie inverter, and is configured as a photovoltaic power generation grid-tie inverter. Note that, in the following respective embodiments, the same reference numerals are assigned to the same or corresponding constituents as or to constituents of the grid-tie inverter of Embodiment 1 described while referring to FIG. 1, and descriptions are made of the constituents concerned.

The grid-tie inverter according to Embodiment 1 includes: an inverter 1; an output filter 2; a first common mode choke coil 31; a second common mode choke coil 32; a third common mode choke coil 33; a fourth common mode choke coil 34; a first capacitor pair 41; a second capacitor pair 42; a solar cell 5; a grid transformer 7; a booster circuit 8; a DC line capacitor 9; a normal mode reactor 10; a grounded capacitor 11; a first resistor 12; and a second resistor 13. The first common mode choke coil 31 and the second common mode choke coil 32 compose a first common mode choke coil unit. The third common mode choke coil 33 and the fourth common mode choke coil 34 compose a second common mode choke coil unit. In FIG. 1, a stray capacitance that exists between the solar cell 5 and the ground is illustrated as a capacitor 6a and a capacitor 6b.

The solar cell 5 as a DC power supply generates a DC voltage, and supplies electric power to the inverter 1 via the third common mode choke coil 33, the first capacitor pair 41, the second common mode choke coil 32, the booster circuit 8, and the DC line capacitor 9. Note that the DC power supply for use in the grid-tie inverter according to each of the embodiments is not limited to the solar cell, and a fuel cell and other devices, which generate the DC voltage, can be used.

The third common mode choke coil 33 is provided on an output side of the solar cell 5, and at a front stage of the first capacitor pair 41, and suppresses a common mode current that flows through the stray capacitance 6 of the solar cell 5.

The second common mode choke coil 32 is provided on an output side of the first capacitor pair 41, and at a front side of the booster circuit 8. The second common mode choke coil 32 suppresses the common mode current that flows through a neutral point grounding line i of the grid transformer 7 and the stray capacitance 6 of the solar cell 5 owing to a common mode voltage generated by switching of a switching element included in the inverter 1.

The booster circuit 8 includes a reactor 81, a switching element 82 and a diode 83. One end of the reactor 81 is connected to a positive electrode-side output terminal of the second common mode choke coil 32. The other end of the reactor 81 is connected to an anode of the diode 83. A cathode of the diode 83 is connected to a positive electrode-side input terminal of the inverter 1. The switching element 82 is composed, for example, of a field-effect transistor (FET) or the like. A drain of the switching element 82 is connected to a node between the reactor 81 and the diode 83. A source of the switching element 82 is connected to a negative electrode-side output terminal of the second common mode choke coil 32 and a negative electrode-side input terminal of the inverter 1. The booster circuit 8 boosts an output voltage of the solar cell 5, and sends the boosted output voltage to the inverter 1 via the DC line capacitor 9. Note that, in the case where it is unnecessary to boost the output voltage of the solar cell 5, this booster circuit 8 can be removed.

Figure 2:
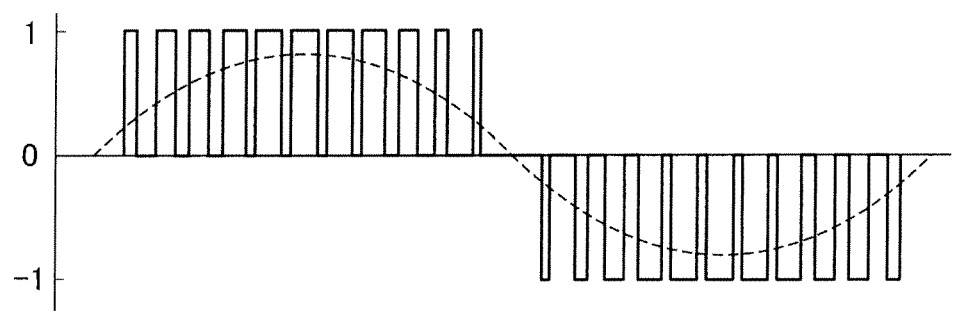
FIG. 2 is a chart illustrating a PWM wave to be outputted in a case where an inverter as a constituent of the grid-tie inverter according to each embodiment is driven in accordance with a three-level PWM control method.

The inverter 1 is composed of a bridge circuit made of semiconductor elements such as FETs and IGBTs. The inverter 1 is driven in accordance with a three-level PWM control method, and converts, into a PWM voltage waveform, the DC voltage supplied from the solar cell 5 through the booster circuit 8, followed by output thereof. For example, as illustrated in FIG. 2, the PWM voltage waveform has amplitude changing from +1 to 0 or from 0 to −1, and has a pulse waveform with a pulse width changing sinusoidally. The PWM voltage waveform outputted from the inverter 1 is sent to the output filter 2 via the first common mode choke coil 31.

The first common mode choke coil 31 is provided on an output side of the inverter 1, and at a front stage of the second capacitor pair 42. The first common mode choke coil 31 suppresses the common mode current that flows through the neutral point grounding line i of the grid transformer 7 and the stray capacitance 6 of the solar cell 5 owing to the common mode voltage generated by the switching of the inverter 1.

The output filter 2 includes: first reactors 21 (21a, 21b) of which input ends are connected to respective output terminals of the first common mode choke coil 31; and an interphase capacitor 22 connected between respective output ends of the first reactors 21 (21a, 21b). The output filter 2 converts the PWM wave, which is sent from the inverter 1 through the first common mode choke coil 31, into a sine voltage waveform as illustrated by a broken line in FIG. 2, followed by output thereof.

The normal mode reactor 10 is arranged between the second capacitor pair 42 and a positive electrode-side output terminal of the output filter 2, more specifically, a node between the interphase capacitor 22 and the first reactor 21a, which compose the output filter 2. The normal mode reactor 10 composes an LC filter together with the interphase capacitor 22 and the second capacitor pair 42.

The fourth common mode choke coil 34 is provided on an input side of the grid transformer 7, and at a rear stage of the second capacitor pair 42, and suppresses the common mode current that flows toward the grid transformer 7.

The first capacitor pair 41 is composed in such a manner that a capacitor 41a and a capacitor 41b are connected in series to each other. The first capacitor pair 41 is arranged between the third common mode choke coil 33 and the second common mode choke coil 32, and between a positive electrode-side output terminal (point a) of the third common mode choke coil 33 and a negative electrode-side output terminal (point b) thereof. At the point a, a DC line positive voltage appears. At the point b, a DC line negative voltage appears. At a node between the capacitor 41a and the capacitor 41b, a DC line neutral point c is formed. By a neutral point connecting line g, the DC line neutral point c is connected to an AC output neutral point f of the second capacitor pair 42 via the second resistor 13.

The second capacitor pair 42 is composed in such a manner that a capacitor 42a and a capacitor 42b are connected in series to each other. The second capacitor pair 42 is arranged between a positive electrode-side input terminal (point d) of the fourth common mode choke coil 34 and a negative electrode-side input terminal (point e) thereof. Between the point d and the point e, a sine wave AC voltage (AC output voltage) appears. At a node between the capacitor 42a and the capacitor 42b, the AC output neutral point f is formed. As mentioned above, by the neutral point connecting line g, the AC output neutral point f is connected to the DC line neutral point c via the second resistor 13.

A point j located on the way of the neutral point connecting line g is grounded through a series circuit composed of the grounded capacitor 11 and the first resistor 12. Moreover, the second resistor 13 is inserted between the point j of the neutral point connecting line g and the AC output neutral point f. The neutral point connecting line g becomes a bypass channel of the common mode current (leakage current).

A capacitor 14 is provided between output terminals of the fourth common mode choke coil 34, and composes a normal mode LC filter together with a normal mode reactance component of the fourth common mode choke coil 34.

The grid transformer 7 transforms the sine wave AC voltage outputted from the grid-tie inverter through the fourth common mode choke coil 34, and outputs the transformed sine wave AC voltage from electric power grid ends h for connecting the grid-tie inverter to an electric power grid. A neutral point of the grid transformer 7 is connected to the ground by the neutral point grounding line i.

In the grid-tie inverter according to Embodiment 1, which is configured as described above, a "leakage current channel" is formed, in which the leakage current flows through such a route that goes from the neutral point grounding line i of the grid transformer 7 through the ground to the stray capacitance 6 of the solar cell 5. Moreover, a "bypass channel" is also formed, in which the leakage current flows through such a route that goes from the output of the inverter 1 through the second capacitor pair 42, the neutral point connecting line g and the first capacitor pair 41 to the input of the inverter 1. At a main frequency of the leakage current (equal to the switching frequency of the inverter 1), impedance of the bypass channel is sufficiently smaller than impedance of the leakage current channel. Impedance of the sum of those of the first common mode choke coil 31 and the second common mode choke coil 32 is larger than the impedance of each of the leakage current channel and the bypass channel.

Hence, most of the leakage current flows through the bypass channel with such lower impedance, and a magnitude thereof is suppressed by the first common mode choke coil 31 and the second common mode choke coil 32. As a result, the leakage current that flows outside of the grid-tie inverter is suppressed. The matter that the leakage current is suppressed stands for that a common mode noise within a frequency band of the leakage current is suppressed.

Moreover, in the grid-tie inverter according to Embodiment 1, which is configured as described above, the third common mode choke coil 33 suppresses a high frequency common mode noise on the power supply side, and the fourth common mode choke coil 34 suppresses a high frequency common mode noise on the grid side. Furthermore, the neutral points of such input/output lines of the inverter 1 are connected to the ground as a stable potential through the first capacitor pair 41 and the second capacitor pair 42, the neutral point connecting line g, the grounded capacitor 11 and the first resistor 12. With such a configuration, outflow of a high frequency noise to the outside of the grid-tie inverter is suppressed. The first resistor 12 suppresses a resonance that passes through a ground channel of the neutral point connecting line g. A resistance value of the second resistor 13 is set so as to become smaller than impedance of the leakage current channel that passes through the ground, and suppresses a resonance that passes through the neutral point connecting line g. Voltages to be applied to the third common mode choke coil 33 and the fourth common mode choke coil 34 are small, and accordingly, it is sufficient that a size of these components is small. Note that, in the case where the noise on the power supply side or the grid side is not regarded as a problem, the third common mode choke coil 33 or the fourth common mode choke coil 34, in which the noise is not regarded as a problem, can be omitted.

Capacitance of each of the interphase capacitor 22 and the second capacitor pair 42 is relatively large, and accordingly, the LC filter composed of the interphase capacitor 22, the normal mode reactor 10 and the second capacitor pair 42 can effectively suppress a harmonic noise of the normal mode even if the normal mode reactor 10 that is small is added thereto. Note that, in the case where the harmonic wave of the normal mode is not regarded as a problem, the normal mode reactor 10 can be omitted.

The capacitor 14 composes the LC filter together with the normal mode reactance component of the fourth common mode choke coil 34. As described above, the LC filter can be composed just by adding the capacitor 14, and this LC filter suppresses the high frequency noise of the normal mode. Note that, in the case where the harmonics of the normal mode are not regarded as a problem, the capacitor 14 can be omitted.

As described above, in accordance with the grid-tie inverter according to Embodiment 1, a configuration is adopted so that the first to fourth common mode choke coils 31, 32, 33 and 34 can be arranged, that the AC output neutral point f on the output side of the inverter 1 and the DC line neutral point c on the input side thereof can be connected to each other, and that the high frequency component can be guided to the ground by the grounded capacitor 11. With such a configuration, the leakage current and the noise can be suppressed from flowing outside of the grid-tie inverter.

Figure 3:
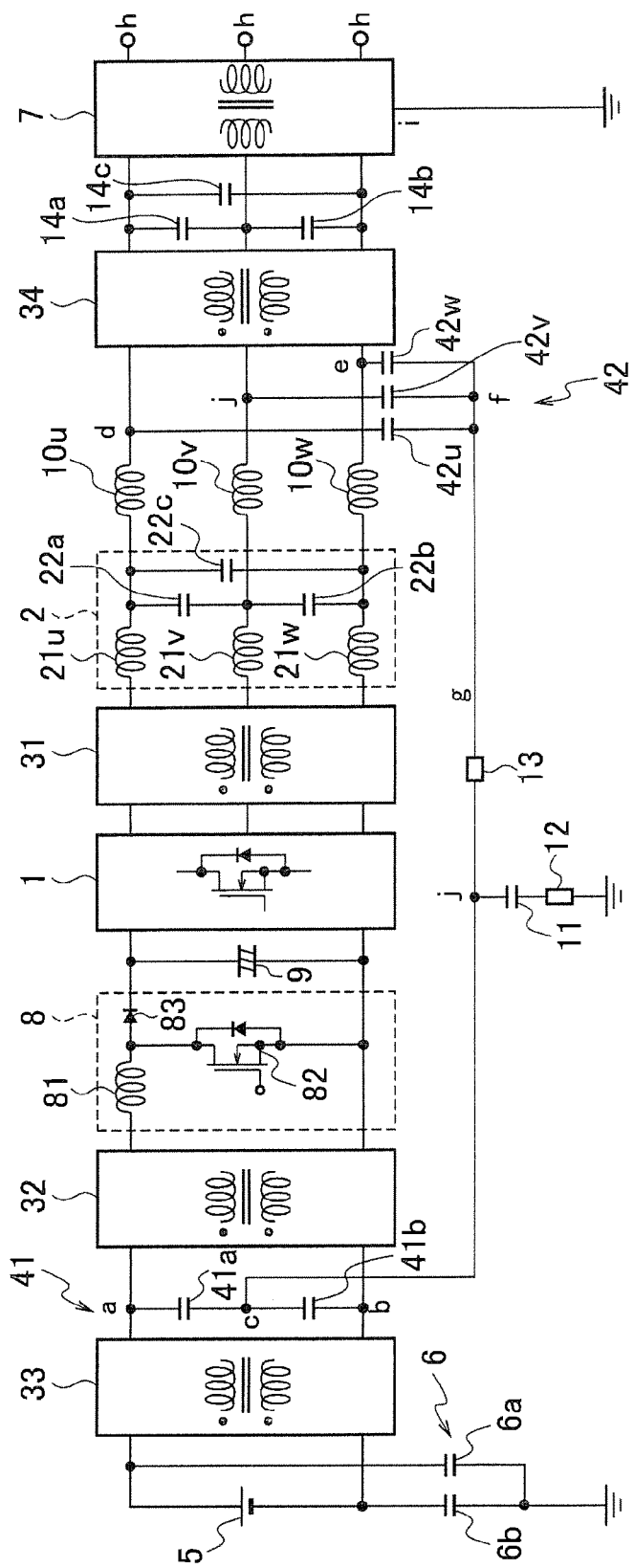
FIG. 3 is a block diagram illustrating a configuration of a three-phase grid-tie inverter obtained by modifying the grid-tie inverter according to Embodiment 1.

Note that, in the grid-tie inverter according to Embodiment 1 mentioned above, an example where the embodiment is applied to the single-phase grid-tie inverter has been illustrated; however, the embodiment can be applied also to a three-phase grid-tie inverter. As illustrated in FIG. 3, the three-phase grid-tie inverter is composed in such a manner that the grid-tie inverter according to Embodiment 1 mentioned above is modified as follows. The inverter 1 for the single phase is replaced by an inverter 1 for the three phases. Each of the first common mode choke coil 31 and the fourth common mode choke coil 34 is replaced by a common mode choke coil for the three phases. The first reactors 21 (21a, 21b) of the output filter 2 are replaced by first reactors 21 (21u, 21v, 21w) inserted into respective phases. The interphase capacitor 22 is replaced by three interphase capacitors 22 (22a, 22b, 22c) which connect the respective phases of the three phases to one another. The normal mode reactor 10 is replaced by normal mode reactors 10 (10u, 10v, 10w) inserted into the respective phases. The capacitor 14 is replaced by three capacitors 14 (14a, 14b, 14c) which connect the respective phases to one another. The second capacitor pair 42 (42a, 42b) is replaced by three second capacitors 42 (42u, 42v, 42w), and is composed so as to form a neutral point of the respective phases.

Moreover, the grid-tie inverter according to Embodiment 1 can also be modified as follows. Specifically, the bypass channel can also be composed only of the grounded capacitor 11 by removing the first resistor 12 and the second resistor 13, which are illustrated in FIG. 1.

The grounded capacitor 11 has a role to guide the high frequency noise to the ground; however, in the case where the resonance that passes through the neutral point connecting line g and the grounded capacitor 11 does not occur or is not regarded as a problem, the first resistor 12 for suppressing the resonance can be removed. Also in such a configuration, the high frequency noise and the leakage current, which flow outside of the grid-tie inverter can be suppressed.

In a similar way, the second resistor 13 inserted into the neutral point connecting line g is for use in suppressing the resonance that passes through the bypass channel; however, can be removed in the case where the resonance does not occur or is not regarded as a problem. Moreover, the second resistor 13 is provided between the point j of the neutral point connecting line g and the AC output neutral point f; however, can also be provided between the point j of the neutral point connecting line g and the DC line neutral point c.

Furthermore, in the case where the high frequency noise is not regarded as a problem, a configuration can also be adopted so that the bypass channel cannot be grounded by removing both of the grounded capacitor 11 and the first resistor 12 in the bypass channel. Also in the case of this configuration, similar effects to those of the grid-tie inverter according to Embodiment 1 mentioned above can be obtained.

Embodiment 2

Figure 4:
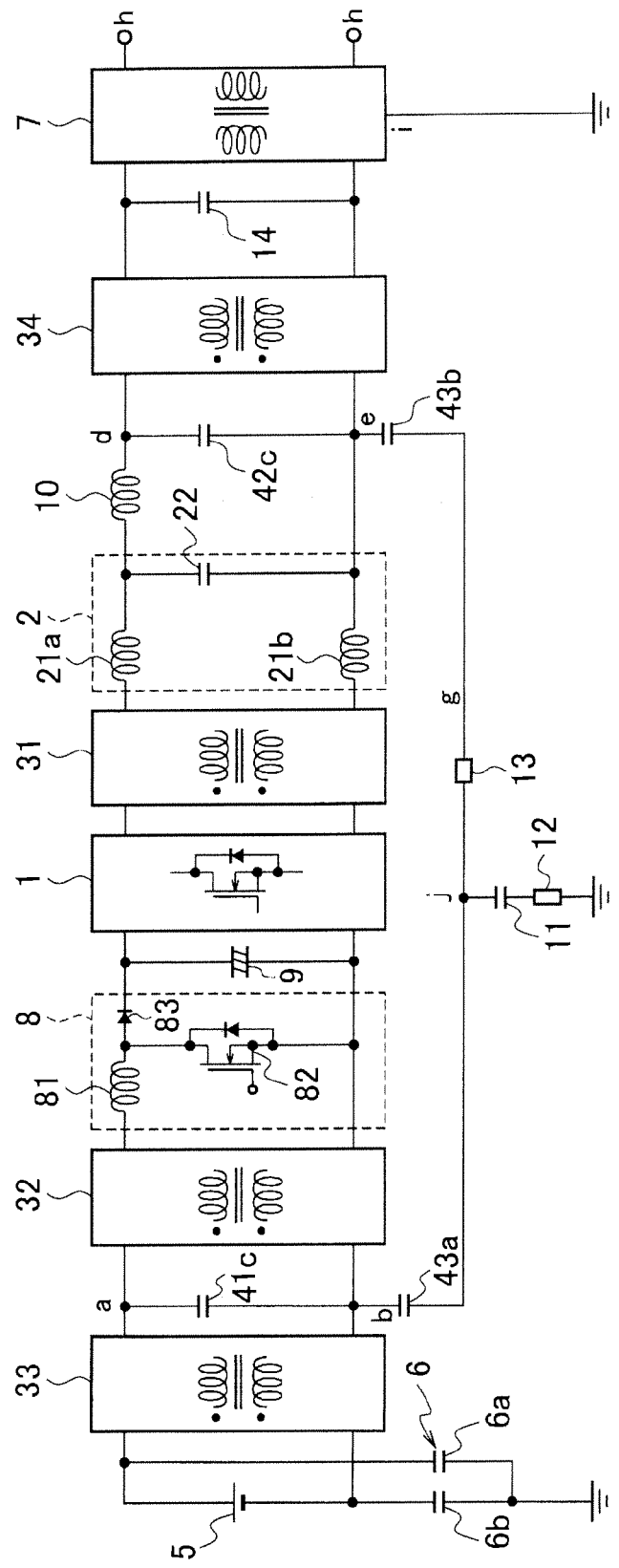
FIG. 4 is a block diagram illustrating a configuration of a grid-tie inverter according to Embodiment 2.

In a grid-tie inverter according to Embodiment 2, as illustrated in FIG. 4, the first capacitor pair 41 of the grid-tie inverter according to Embodiment 1 is replaced by one first capacitor 41c, and the second capacitor pair 42 thereof is replaced by one second capacitor 42c. A capacitor 43a is inserted into a route that reaches the point j on the neutral point connecting line g from the node (point b) between the capacitor 41c and the negative electrode-side output terminal of the third common mode coke coil 33 (that is, the negative electrode-side input terminal of the second common mode choke coil 32). A capacitor 43b is inserted into a route that reaches the second resistor 13 from the node (point e) between the negative electrode-side output terminal of the output filter 2 and the negative electrode-side input terminal of the fourth common mode choke coil 34.

In the grid-tie inverter according to Embodiment 1 mentioned above, the DC line neutral point c formed on the input side of the inverter 1 and the AC output neutral point f formed on the output side thereof are connected to each other through the second resistor 13, whereby the bypass channel of the leakage current is formed. As opposed to this, in the grid-tie inverter according to Embodiment 2, the capacitor 43a and the capacitor 43b are inserted on the way of the neutral point connecting line g that connects the point b and the point e to each other through the second resistor 13, whereby the bypass channel is formed. Then, the point j on the neutral point connecting line g is grounded after passing sequentially through the grounded capacitor 11 and the first resistor 12.

In accordance with the grid-tie inverter according to Embodiment 2, most of the leakage current flows through the bypass channel with the lower impedance in a similar way to the grid-tie inverter according to Embodiment 1. The magnitude of the leakage current that flows through the bypass channel is suppressed by the second common mode choke coil 32 and the first common mode choke coil 31. As a result, the leakage current that flows outside of the grid-tie inverter is suppressed. Moreover, the high frequency noise is suppressed from the outflow by functions of the third common mode choke coil 33 and the fourth common mode choke coil 34 and the grounded capacitor 11 of the bypass channel.

Note that, in the grid-tie inverter according to Embodiment 2 mentioned above, the capacitor 43a and the capacitor 43b are interposed on the way of the neutral point connecting line g that connects the point e and the point b to each other through the second resistor 13, whereby the bypass channel is formed. As opposed to this, such a configuration as follows can also be adopted. Specifically, the capacitor 43a and the capacitor 43b are interposed between the point a connected to the positive electrode-side input terminal of the inverter 1 and the point d on the output side of the output filter 2 (that is, a node between the normal mode reactor 10 and the positive electrode-side input terminal of the fourth common mode choke coil 34) or the point e thereon, whereby the bypass channel is formed.

Moreover, in a similar way to the grid-tie inverter according to Embodiment 1, such a configuration as follows can also be adopted. Specifically, the DC line neutral point c made of the first capacitor pair 41 is formed on the input side of the inverter 1, the DC line neutral point c and the point j to which the grounded capacitor 11 of the bypass channel is connected are connected to each other, and the point j and the point d or point e on the output side of the output filter 2 are connected to each other while interposing the capacitor 43b therebetween, whereby the bypass channel is formed. In this case, a configuration can be adopted so that the one second capacitor 42c can be used in place of the second capacitor pair 42.

In a similar way, such a configuration as follows can also be adopted. Specifically, the AC output neutral point f is formed on the output side of the inverter 1, the one capacitor 41c is used in place of the first capacitor pair 41 on the input side of the inverter 1, the AC output neutral point f and the point j to which the grounded capacitor 11 of the bypass channel is connected are connected to each other, and the point j and the point a or point b on the input side of the inverter 1 are connected to each other while interposing the capacitor 43a therebetween, whereby the bypass channel is formed. Note that, in the case where the resonance that passes through the grounded capacitor 11 does not occur or is not regarded as a problem, the first resistor 12 can be removed. Moreover, in the case where the resonance that passes through the bypass channel does not occur or is not regarded as a problem, the second resistor 13 can be removed.

Figure 5:
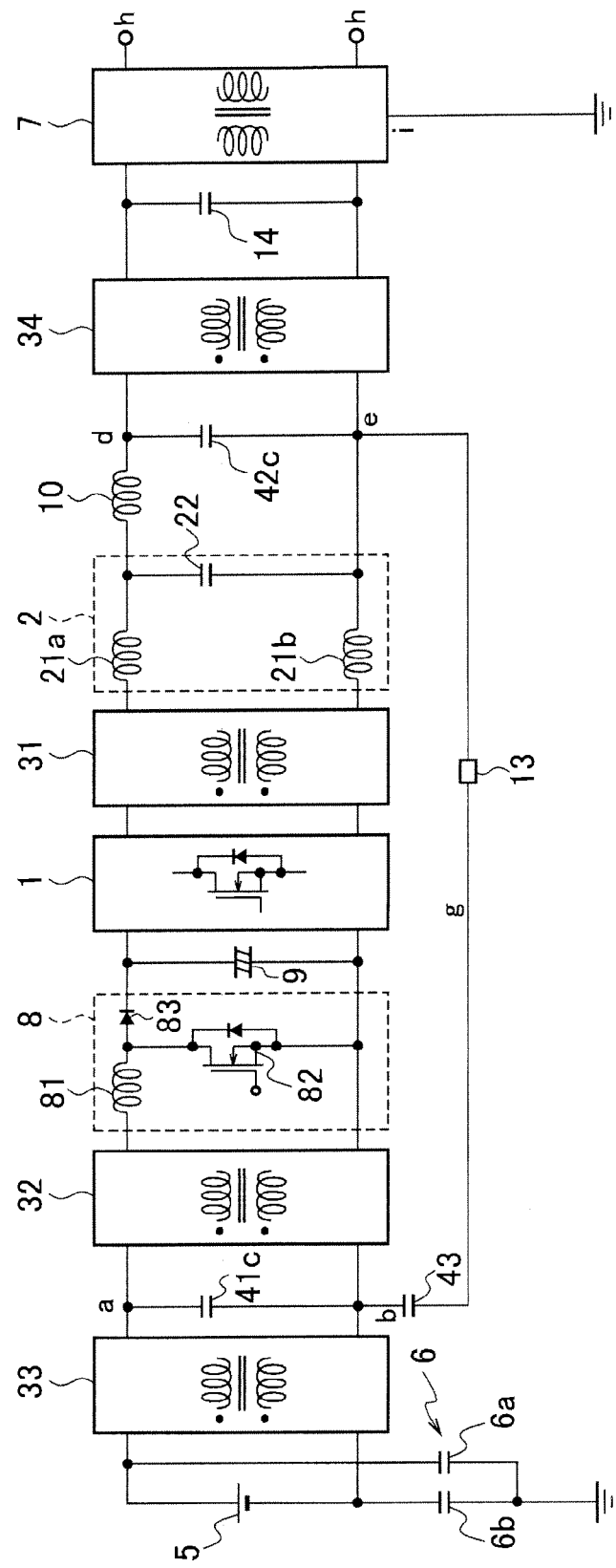
FIG. 5 is a block diagram illustrating a configuration of a modification example of the grid-tie inverter according to embodiment 2.

Moreover, in the case where the one first capacitor 41c and the one second capacitor 42c are used for the first capacitor pair 41 and the second capacitor pair 42, respectively, and where the bypass channel is not grounded, then as illustrated in FIG. 5, a modification can be adopted so that the point b and the point e can be connected to each other only by one capacitor 43. Also in the case of such a configuration, similar effects to those in the case of using the first capacitor pair 41 and the second capacitor pair 42 can be obtained. Note that, in the case where the resonance that passes through the bypass channel does not occur or is not regarded as a problem, the second resistor 13 can be removed.

Furthermore, the grid-tie inverter according to Embodiment 2 can also be modified into a three-phase grid-tie inverter. In this case, the inverter 1 for the single phase is replaced by an inverter 1 for the three phases. Each of the first common mode choke coil 31 and the fourth common mode choke coil 34 is replaced by the common mode choke coil for the three phases. The first reactors 21 (21a, 21b) of the output filter 2 are replaced by first reactors 21 (21u, 21v, 21w) inserted into the respective phases. The interphase capacitor 22 is replaced by three interphase capacitors 22 (22a, 22b, 22c) which connect the respective phases to one another. The normal mode reactor 10 is replaced by, normal mode reactors 10 (10u, 10v, 10w) inserted into the respective phases of the three phases. The capacitor 14 is replaced by three capacitors 14 (14a, 14b, 14c) which connect the respective phases to one another. The capacitor 42c connects the respective phases to one another by three second capacitors 42 (42u, 42v, 42w), and one end of the bypass channel is connected to one phase thereamong.

Embodiment 3

Figure 6:
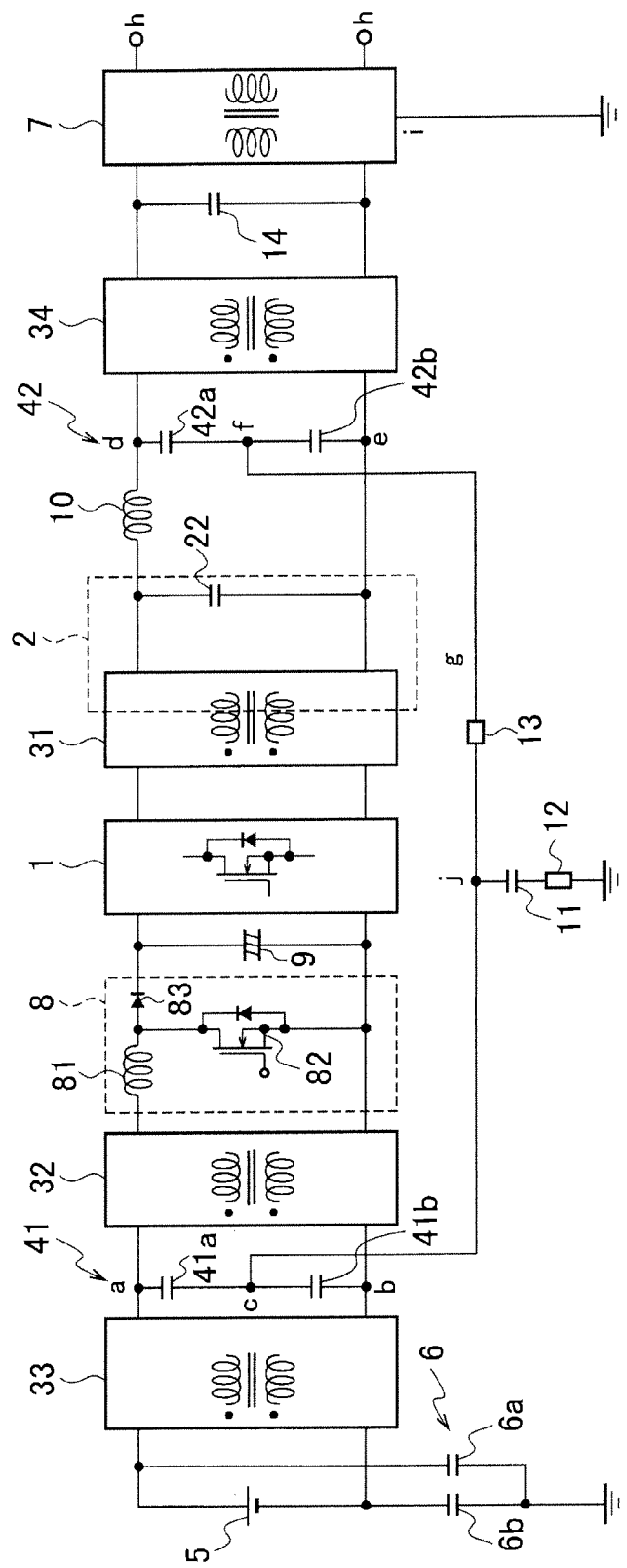
FIG. 6 is a block diagram illustrating a configuration of a grid-tie inverter according to Embodiment 3.

As illustrated in FIG. 6, a grid-tie inverter according to Embodiment 3 is composed in such a manner that the first reactors 21 (21a, 21b) are removed from the output filter 2 of the grid-tie inverter according to Embodiment 1, and that only the interphase capacitor 22 is left therein.

In the grid-tie inverter according to Embodiment 1, the output filter 2 is composed of the first reactors 21 (21a, 21b) and the interphase capacitor 22; however, the normal mode inductance component contained in the first common mode choke coil 31 functions similarly to the first reactors 21 (21a, 21b) of the output filter 2. Therefore, in the grid-tie inverter according to Embodiment 3, the normal mode inductance component of the first common mode choke coil 31 is used as a replacement for the first reactors 21 (21a, 21b) of the output filter 2.

In accordance with the grid-tie inverter according to Embodiment 3, the leakage current and the high frequency noise, which flow outside of the grid-tie inverter, are suppressed in a similar way to the grid-tie inverter according to Embodiment 1 mentioned above. Moreover, the first reactors 21 (21a, 21b) for composing the output filter 2 become unnecessary, and accordingly, the inexpensive and compact grid-tie inverter can be provided.

Note that such a configuration as follows can also be composed. Specifically, the interphase capacitor 22 of the output filter 2 and the normal mode reactor 10 are removed, and the capacitor 42a and the capacitor 42b, which compose the second capacitor pair 42, are used as a replacement for the role of the interphase capacitor 22. Moreover, the grid-tie inverter according to Embodiment 3 can also be modified to a three-phase grid-tie inverter in a similar way to the grid-tie inverter according to Embodiment 1 or Embodiment 2.

Embodiment 4

Figure 7:
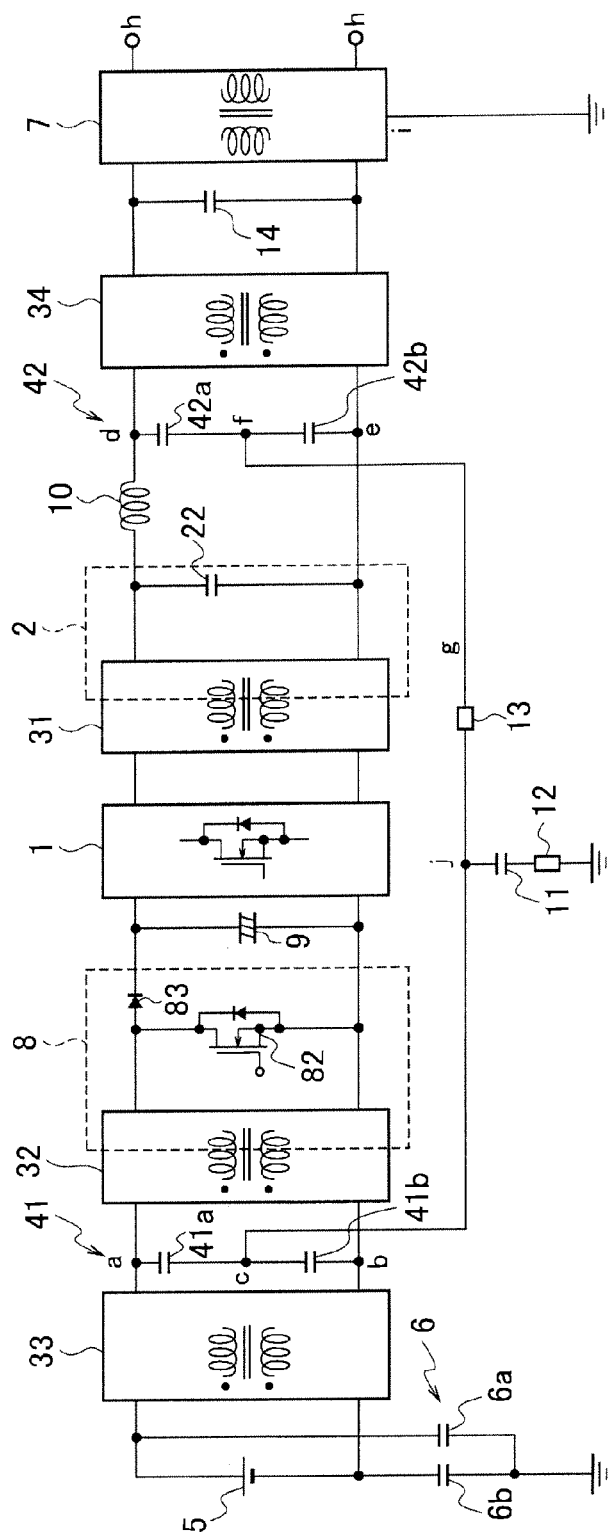
FIG. 7 is a block diagram illustrating a configuration of a grid-tie inverter according to Embodiment 4.

As illustrated in FIG. 7, a grid-tie inverter according to Embodiment 4 is composed in such a manner that the first reactors 21 (21a, 21b) are removed from the output filter 2 of the grid-tie inverter according to Embodiment 1, and in addition, that the reactor 81 is removed from the booster circuit 8.

In the grid-tie inverter according to Embodiment 1, the booster circuit 8 includes the reactor 81, the switching element 82 and the diode 83. However, the normal mode inductance component contained in the second common mode choke coil 32 functions similarly to the reactor 81 of the booster circuit 8. Therefore, in the grid-tie inverter according to Embodiment 4, the normal mode inductance component of the second common mode choke coil 32 is used as a replacement for the reactor 81 of the booster circuit 8. Moreover, in a similar way to Embodiment 3, the normal mode inductance component of the first common mode choke coil 31 is used as a replacement for the first reactors 21 (21a, 21b) of the output filter 2.

In accordance with the grid-tie inverter according to Embodiment 4, the leakage current and the high frequency noise, which flow outside of the grid-tie inverter, are suppressed in a similar way to the grid-tie inverter according to Embodiment 1 mentioned above. Moreover, the reactor 81 for composing the booster circuit 8 becomes unnecessary, and accordingly, a more inexpensive and compact grid-tie inverter than the grid-tie inverter according to Embodiment 1 can be provided. Furthermore, the grid-tie inverter according to Embodiment 4 can also be modified to a three-phase grid-tie inverter in a similar way to the grid-tie inverter according to each of Embodiment 1 to Embodiment 3.

Embodiment 5

Figure 8:
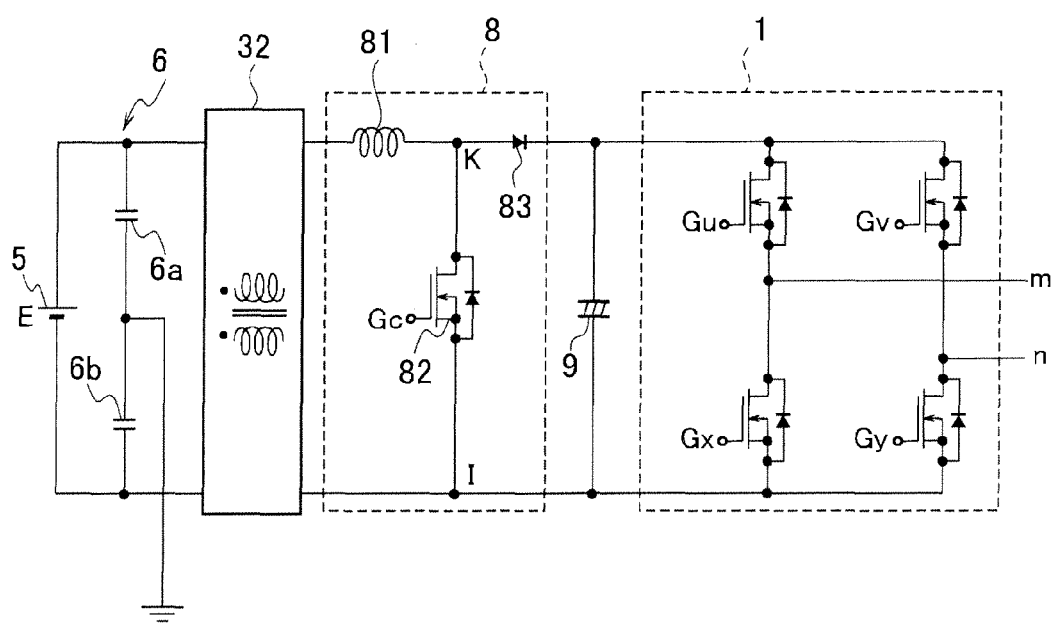
FIG. 8 is a block diagram partially illustrating a configuration of a grid-tie inverter according to Embodiment 5.

FIG. 8 is a block diagram partially illustrating a configuration of a grid-tie inverter according to Embodiment 5, and extracts and illustrates only the solar cell 5, the stray capacitance 6, the second common mode choke coil 32, the booster circuit 8, the DC line capacitor 9 and the inverter 1 in the grid-tie inverter according to each of Embodiments 1 to 4 mentioned above.

Figure 9:
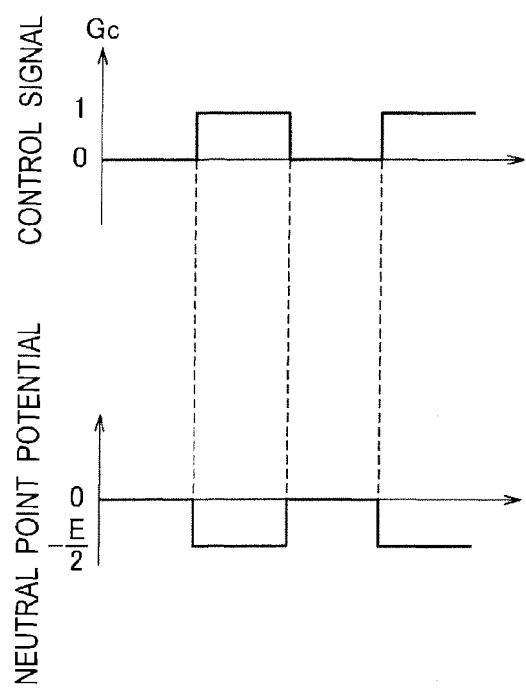
FIGS. 9(a) and 9(b) are timing charts illustrating operations of the grid-tie inverter according to Embodiment 5.
Figure 9:
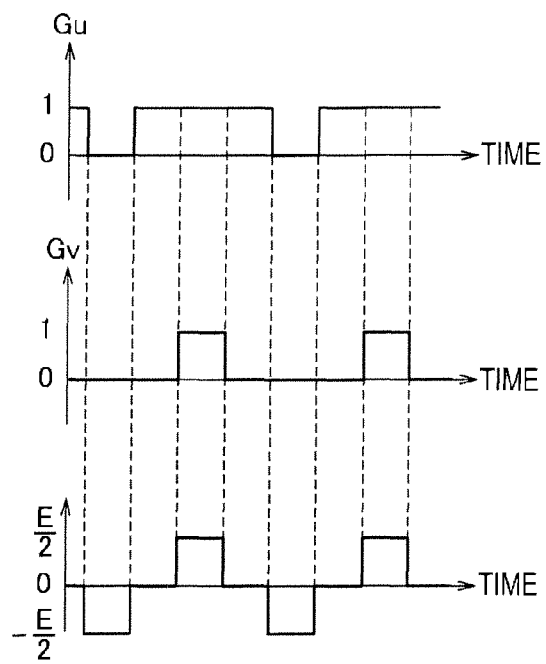

The booster circuit 8 and the inverter 1 include the switching elements such as FETs, and convert the electric power by ON/OFF of these switching elements; however, in this event, cause variations of the common mode voltage. In the booster circuit 8, as illustrated in a timing chart of FIG. 9(a), when the voltage of the solar cell 5 is E, a neutral point potential that appears between output ends (k and i ends) changes between levels of 0 and −E/2 following ON/OFF operations by a gate control signal Gc of the switching element 82.

The single-phase inverter 1 has an H-bridge configuration by switching elements, and is controlled in accordance with the three-level PWM. Here, a gate control signal Gx is a signal obtained by inverting a gate control signal Gu. Moreover, a gate signal Gy is a signal obtained by inverting a gate control signal Gv. As illustrated in a timing chart of FIG. 9(b), when the booster circuit 8 does not operate, a neutral point potential between output ends m and n of the inverter 1 change among levels of −E/2, 0 and E/2 following switching of the switching elements by the gate control signals Gu, Gv, Gx and Gy.

The variations of the neutral point potentials owing to the switching of the booster circuit 8 and the inverter 1 cause the leakage current and the high frequency noise, which flow to the ground.

Figure 10:
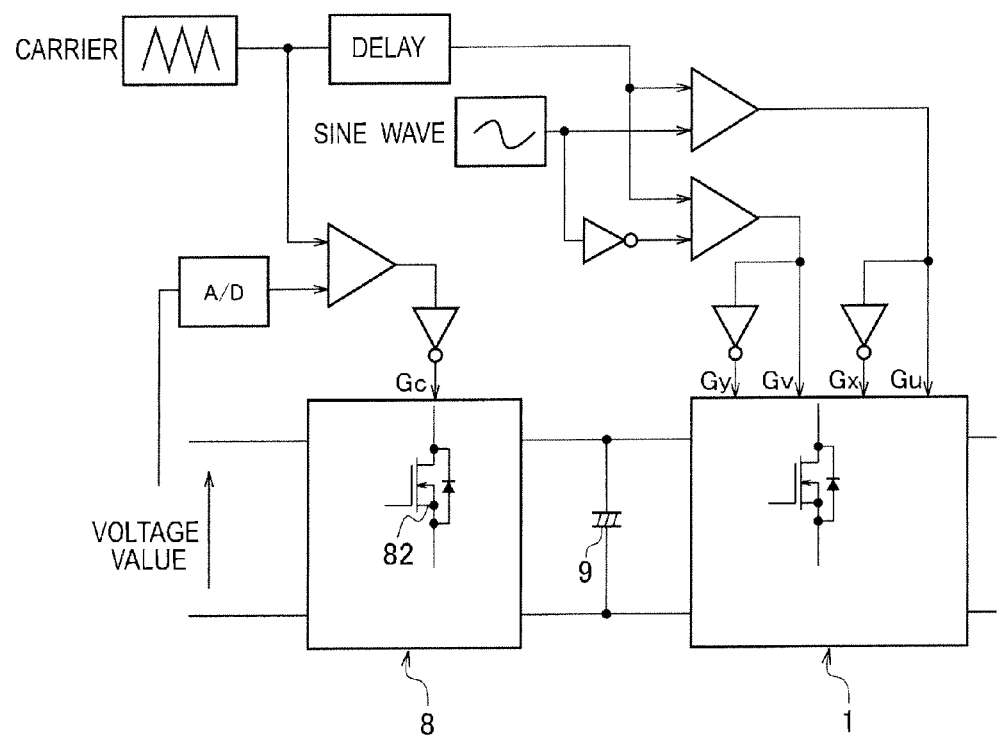
FIG. 10 is a block diagram illustrating a configuration of a control circuit of the grid-tie inverter according to Embodiment 5.

The grid-tie inverter according to Embodiment 5 suppresses the variations of the neutral point voltages of the booster circuit 8 and the inverter 1, the variations being as mentioned above. In the grid-tie inverter according to each of Embodiments 1 to 4 mentioned above, a description of a control circuit that creates the gate control signals Ge, Gu, Gv, Gx and Gy of the booster circuit 8 and the inverter 1 is omitted; however, FIG. 10 illustrates a configuration of a control circuit of the grid-tie inverter according to Embodiment 5. The control circuit creates the gate control signals Ge, Gu, Gv, Gx and Gy of the booster circuit 8 and the inverter 1 based on a carrier having a predetermined frequency.

The gate control signal Gc of the booster circuit 8 is created by comparing, with each other, the carrier and a voltage value obtained by performing A/D conversion for an input voltage to the booster circuit 8, and switches on the switching element 82 when the voltage value is smaller than a level of the carrier. In such a way, a boosting rate of the booster circuit 8 is increased as the voltage value is being smaller.

The gate control signals Gu, Gv, Gx and Gy of the inverter 1 are created by comparison between the carrier and the sine wave, and when the level of the sine wave is larger than the level of the carrier, a positive logic is outputted. The four switching elements in the inverter 1 (refer to FIG. 8) are controlled by the gate control signals Gu, Gv, Gx and Gy, whereby the inverter 1 is controlled in accordance with the three-level PWM.

Figure 11:
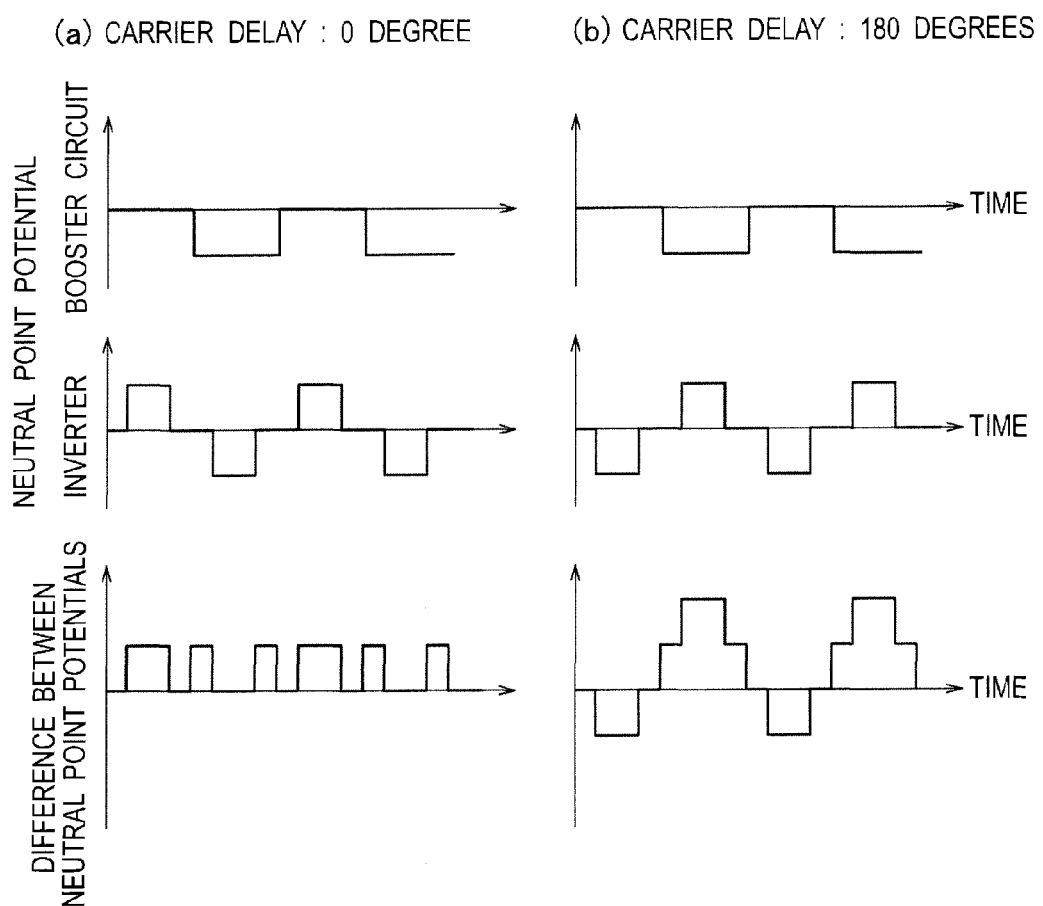
FIGS. 11(a) and 11(b) are timing charts illustrating operations of suppressing variations of neutral point potentials, which occur in the booster circuit and inverter of the grid-tie inverter according to Embodiment 5.

In this case, with regard to the variations of the neutral point potentials, which occur in the booster circuit 8 and the inverter 1, as illustrated in FIG. 11, amplitudes thereof differ from each other; however, frequencies thereof become the same. When the gate control signals Ge, Gu, Gv, Gx and Gy are created by patterns illustrated in FIG. 9, if a phase delay by a delay block that delays the carrier is 0 degree, then as illustrated in FIG. 11(*a*), crest and trough of the phase in each of the variations of the neutral point potentials coincide with each other, and a difference therebetween is partially compensated. A pulse width of the neutral point potential of the inverter 1 changes in a sine wave cycle, and accordingly, the difference is not always compensated. However, as in the grid-tie inverter according to Example 5, if the crest and trough of the phase in each of the varying neutral point potentials are allowed to coincide with each other by using the carrier with the same frequency in the booster circuit 8 and the inverter 1, then the variations of the difference between each of the neutral point potentials can be suppressed as a whole, and the leakage current and the high frequency noise can be suppressed.

In the case where the crest and trough of the phase in each of the neutral point potentials do not coincide with each other, for example, in the case where the phase delay by the delay block is 180 degrees, then as illustrated in FIG. 11(*b*), such a variation range of the difference between each of the neutral point potentials is increased. Moreover, even in the case where the control circuit that creates the gate control signals of the booster circuit 8 and the inverter 1 is different in configuration from that illustrated in the block diagram of FIG. 10, and even in the case where the phases of the gate control signals thus created are different from those of the gate control signals to be created by the control circuit illustrated in the block diagram of FIG. 10, if the crest and trough of the phase in each of the neutral point potentials are allowed to coincide with each other by adjusting the phase of the carrier of the inverter 1 or the booster circuit 8, then the variations of the difference between each of the neutral point potentials can be suppressed as a whole.

In Embodiment 5, the description has been made of the control for the portions of the booster circuit 8 and the inverter 1; however, other portions can be applied to any configuration including the booster circuit 8 among the grid-tie inverters according to Embodiments 1 to 4.

Embodiment 6

Figure 12:
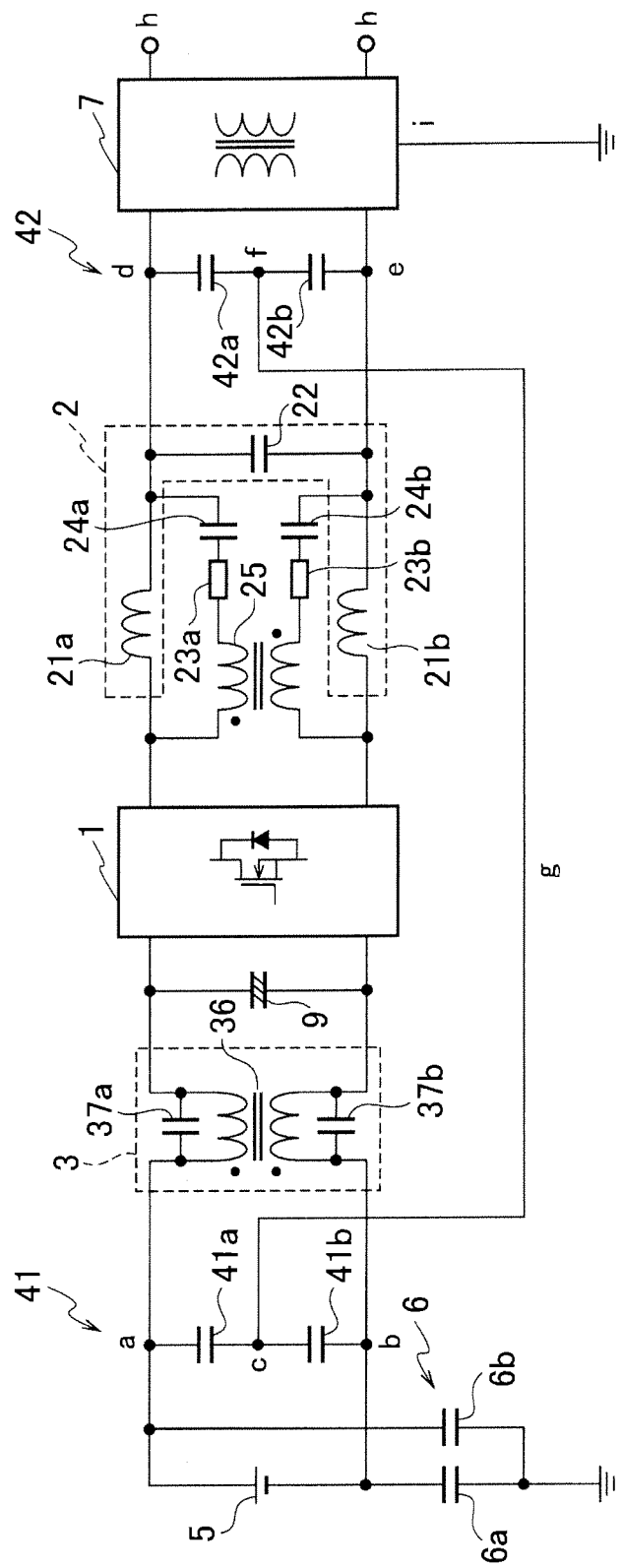
FIG. 12 is a block diagram illustrating a configuration of a grid-tie inverter according to Embodiment 6.

As illustrated in FIG. 12, a grid-tie inverter according to Embodiment 6 is a single-phase photovoltaic power generation grid-tie inverter.

The photovoltaic power generation grid-tie inverter according to Embodiment 6 includes: an inverter 1; an output filter 2; damping resistors 23; capacitors 24; a transformer 25; a common mode choke coil 3; a first capacitor pair 41; a second capacitor pair 42; a solar cell 5; a grid transformer 7; and a DC line capacitor 9. In FIG. 12, a stray capacitance 6 that exists between the solar cell 5 and the ground is illustrated as a capacitor 6*a* and a capacitor 6*b*, a common mode inductance of the common mode choke coil 3 is denoted by reference numeral 36, and inter-winding capacitances of the common mode choke coil 3 are denoted by reference numeral 37 (37*a*, 37*b*).

The solar cell 5 as a DC power supply generates a DC voltage, and supplies electric power to the inverter 1 via the first capacitor pair 41, the common mode coke coil 3 and the DC line capacitor 9. Note that the DC power supply for use in the grid-tie inverter according to each of the embodiments is not limited to the solar cell, and as the DC power supply, a fuel cell and other devices which generate the DC voltage can be used.

The common mode choke coil 3 is provided on an output side of the first capacitor pair 41, and at a front stage of the inverter 1. The common mode choke coil 3 suppresses a common mode current that flows owing to a common mode voltage caused by switching of a switching element included in the inverter 1.

The inverter 1 is composed of a bridge circuit made of semiconductor elements such as FETs and IGBTs. The inverter 1 is driven in accordance with the three-level PWM control method, and converts the DC voltage, which is supplied from the solar cell 5, into a PWM voltage waveform for example as illustrated in FIG. 2, which has amplitude changing from +1 to 0 or from 0 to −1, and has a pulse waveform with a pulse width changing sinusoidally, followed by output thereof.

The output filter 2 includes: first reactors 21 (21*a*, 21*b*) of which input ends are connected to respective output terminals of the inverter 1; and an interphase capacitor 22 (corresponding to a third capacitor) connected between respective output ends of the first reactors 21 (21*a*, 21*b*). The output filter 2 converts a PWM wave, which is outputted by the inverter 1, into a sine voltage waveform as illustrated by the broken line in FIG. 2, followed by output thereof.

The first capacitor pair 41 is composed in such a manner that a capacitor 41*a* and a capacitor 41*b* are connected in series to each other. The first capacitor pair 41 is arranged between the solar cell 5 and the common mode choke coil 3, and between a positive electrode-side output terminal (point a) of the third common mode choke coil 3 and a negative electrode-side output terminal (point b) thereof. At the point a, a DC line positive voltage appears, and at the point b, a DC line negative voltage appears. At a node between the capacitor 41*a* and the capacitor 41*b*, a DC line neutral point c is formed. By a neutral point connecting line g, the DC line neutral point c is connected to an AC output neutral point f of the second capacitor pair 42.

The second capacitor pair 42 is composed in such a manner that a capacitor 42*a* and a capacitor 42*b* are connected in series to each other. The second capacitor pair 42 is arranged between output terminals of the output filter 2 (point d, point e). Between the point d and the point e, a sine wave AC voltage (AC output voltage) appears. At a node between the capacitor 42*a* and the capacitor 42*b*, the AC output neutral point f is formed. As mentioned above, the AC output neutral point f is connected to the DC line neutral point c by the neutral point connecting line g. The neutral point connecting line g becomes a bypass channel of the common mode current (leakage current).

The grid transformer 7 transforms the sine wave AC voltage outputted from the grid-tie inverter, and outputs the transformed sine wave AC voltage from electric power grid ends h for connecting the grid-tie inverter to the electric power grid. A neutral point of the grid transformer 7 is connected to the ground by a neutral point grounding line i.

The damping resistors 23 (23*a* and 23*b*, corresponding to a first resistor) and the capacitors 24 (24*a* and 24*b*, corresponding to a fourth capacitor) are connected in series to each other, and are connected in parallel to the first reactors 21 (21*a*, 21*b*) of the output filter 2. Serial connection routes of the damping resistors 23 and the capacitors 24 are coupled to each other by the transformer 25 with a winding ratio of 1:1. The transformer 25 is wound in such a manner that, for the normal mode, the impedance is increased as a result that inductance is shown, and for the common mode, the inductance is not shown as a result that magnetic fluxes are cancelled with each other. Specifically, the transformer 25 is wound so that a winding direction of a primary winding of the transformer 25 and a winding direction of a secondary winding thereof can be opposite to each other. That is to say, the primary winding and the secondary winding are wound in opposite phases.

In the grid-tie inverter according to Embodiment 6, which is configured as described above, a "leakage current (noise) channel" is formed, in which a high frequency common mode current flows through such a route that goes from the neutral point grounding line i of the grid transformer 7 through the ground to the stray capacitance 6 of the solar cell 5. Moreover, a "bypass channel" is also formed, in which the high frequency common mode current flows through such a route that goes from the output of the inverter 1 through the second capacitor pair 42, the neutral point connecting line g and the first capacitor pair 41 to the input of the inverter 1. At a main frequency of the high frequency leakage current (equal to the switching frequency of the inverter 1), impedance of the bypass channel of the high frequency common mode current is sufficiently smaller than that of the leakage current channel. Impedance of the common mode choke coil 3 is larger than impedance of each of the leakage current channel and the bypass channel.

Hence, most of the high frequency common mode current flows through the bypass channel with such lower impedance, and a magnitude thereof is suppressed by the common, mode choke coil 3. As a result, the high frequency common mode current that flows outside of the grid-tie inverter is suppressed.

Figure 13:
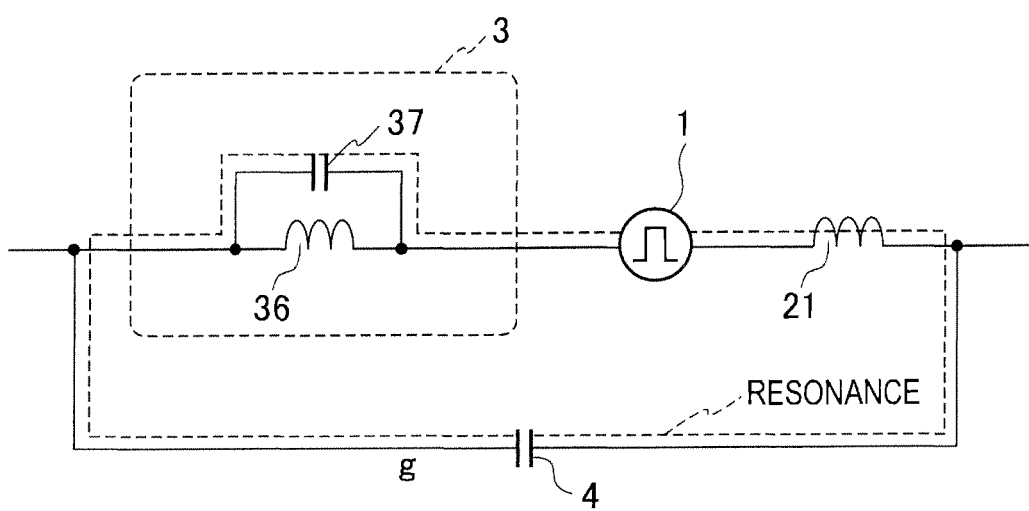
FIG. 13 is an equivalent circuit of a common mode choke coil, the inverter, an output filter and a capacitor pair when viewed from a common mode.

In Embodiment 6, as illustrated in FIG. 13, a common mode resonance occurs between each of the inter-winding capacitances 37 (37a, 37b) of the common mode choke coil and each of the first reactors 21 (21a, 21b) of the output filter 2, and the resonance passes through the neutral point connecting line g. However, the resonance is attenuated by each of the damping resistors 23, and accordingly, the resonance is suppressed. Moreover, each of the capacitors 24 is connected in series to each of the damping resistors 23. Therefore, a current with a low frequency component is cut off by the capacitor 24, and comes not to flow to the damping resistor 23. A value of the capacitor 24 is set so as to cut off a current component with a resonance frequency or less, whereby a wasteful loss that occurs in the damping resistor 23 can be suppressed. A cutoff frequency is calculated by a resonance frequency by the first reactor 21 and the capacitor 24.

Moreover, in the transformer 25, impedance thereof is high for the normal mode, and impedance thereof is low for the common mode. Therefore, most of the current that flows through the damping resistor 23 becomes only the common mode component, and the damping resistor 23 can be allowed to function only for the common mode. The normal mode current comes to hardly flow through the damping resistors 23, and the wasteful loss that occurs in the damping resistor 23 can be suppressed.

As described above, by the functions of the damping resistors 23, the capacitors 24 and the transformer 25, which serve for suppressing the resonance, the resonance that occurs between the inter-winding capacitances 37 of the common mode choke coil 3 and the first reactors 21 of the output filter 2 can be suppressed while suppressing the loss to the minimum.

Note that, in FIG. 12, the common mode choke coil 3 is arranged on the input side of the inverter 1; however, may be arranged on the output side of the inverter 1. Moreover, a plurality of the common mode choke coils 3 may be arranged on both of the input side and output side of the inverter 1.

Furthermore, in the case where winding resistance of the transformer 25 sufficiently functions as a decay component that suppresses the resonance, the damping resistances 23 can be removed.

Figure 14:
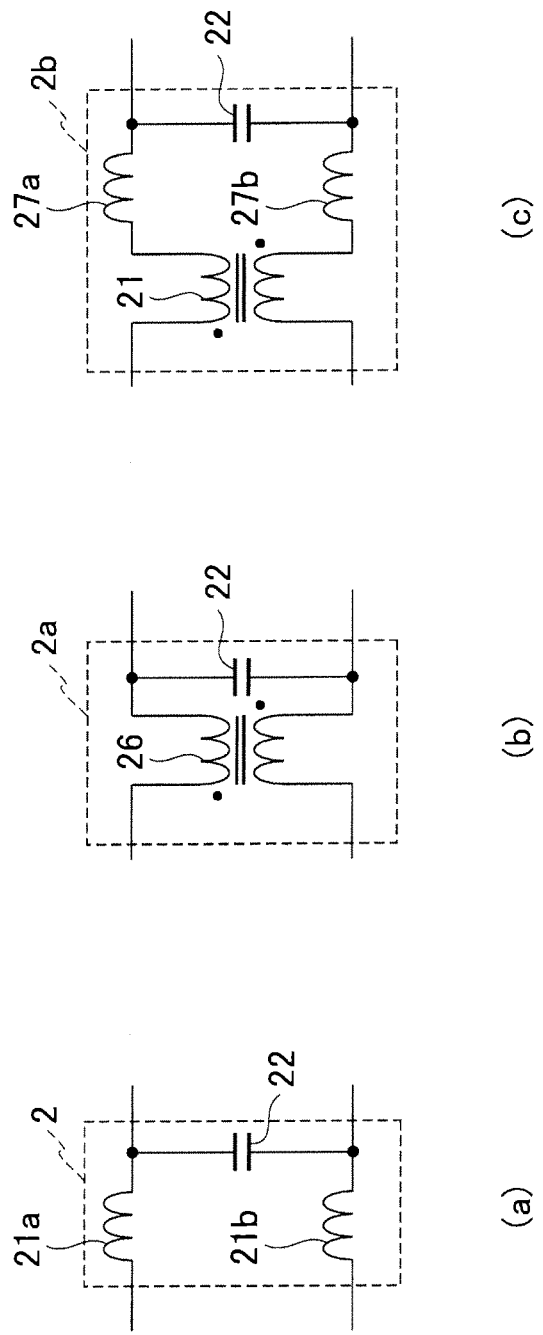
FIG. 14 is a block diagrams illustrating other configurations of the output filter.

Moreover, in Embodiment 6 of FIG. 12, the output filter 2 is composed as illustrated in FIG. 14(a); however, as illustrated in FIG. 14(b), a reactor 26 may be used, in which a primary winding and a secondary winding are magnetically coupled to each other. In the reactor 26, in the common mode, the magnetic fluxes are cancelled with each other, and the inductance is not exhibited, and in the normal mode, the inductance is exhibited since the magnetic fluxes are coupled to each other. In this case, the common mode inductance of the reactor 26 does not exist; however, as illustrated in FIG. 14(c), leakage inductances 27a and 27b exist in the reactor 26. Therefore, the leakage inductances 27a and 27b cause the resonance together with the inter-winding capacitors 37 of the common mode choke coil 3. The damping resistors 23, capacitors 24 and transformer 25 of Embodiment 6 function also for this resonance, and can suppress the resonance while suppressing the loss to the minimum.

Furthermore, in the grid-tie inverter according to Embodiment 6, an example where the embodiment is applied to a single-phase grid-tie inverter has been illustrated; however, the embodiment can be applied also to a three-phase grid-tie inverter.

Figure 15:
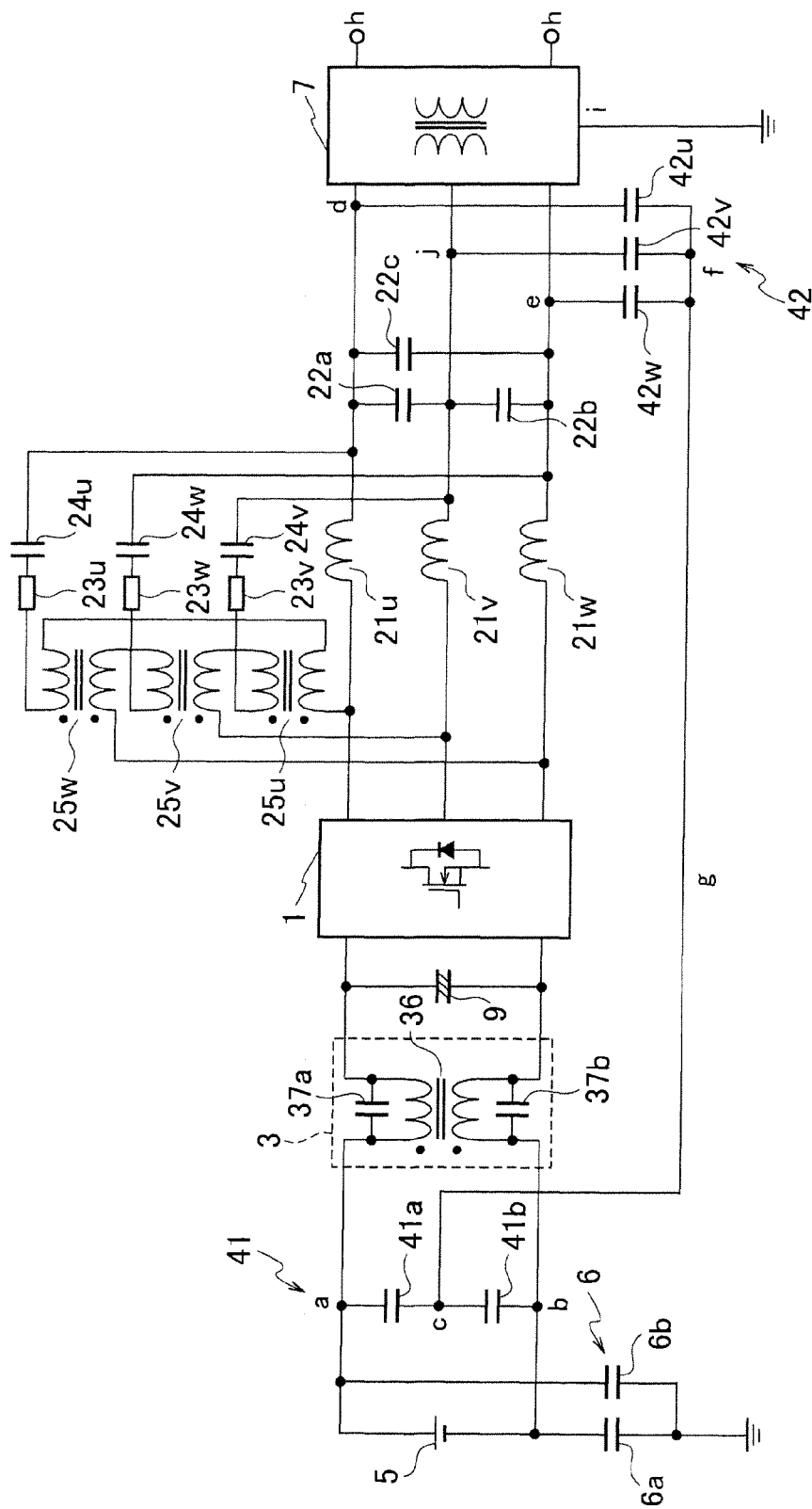
FIG. 15 is a block diagram illustrating a configuration of a photovoltaic power generation grid-tie inverter as a three-phase grid-tie inverter.

As illustrated in FIG. 15, the three-phase grid-tie inverter is composed in such a manner that the grid-tie inverter according to Embodiment 6 mentioned above is modified as follows. The inverter 1 for the single phase is replaced by an inverter for the three phases. The first reactors 21 (21a, 21b) of the output filter 2 are replaced by first reactors 21 (21u, 21v, 21w) inserted into the respective phases. The interphase capacitor 22 is replaced by three interphase capacitors 22 (22a, 22b, 22c) which connect the respective phases of the three phases to one another. The second capacitor pair 42 (42a, 42b) is replaced by three second capacitors 42 (42u, 42v, 42w), and is composed so as to form a neutral point of the respective phases. The damping resistors 23a and 23b and the capacitors 24a and 24b are replaced by damping resistors 23u, 23v and 23w and capacitors 24u, 24v and 24w, which are connected in parallel to the first reactors 21u, 21v and 21w of the respective phases. The transformer 25 is replaced by transformers 25u, 25v and 25w connected to one another so that the magnetic fluxes can be cancelled with one another to lower the impedance for the common mode.

One end of a primary winding of the transformer 25u is connected to the reactor 21u. The other end of the primary winding of the transformer 25u is connected to the damping resistor 23u through a secondary winding of the transformer 25w. One end of a primary winding of the transformer 25v is connected to the reactor 21v. The other end of the primary winding of the transformer 25v is connected to the damping resistor 23v through a secondary winding of the transformer 25u. One end of a primary winding of the transformer 25w is connected to the reactor 21w. The other end of the primary winding of the transformer 25w is connected to the damping resistor 23w through a secondary winding of the transformer 25v.

Moreover, though the booster circuit is not illustrated in the circuit of the grid-tie inverter according to Embodiment 6, it is frequent that the actual photovoltaic power generation grid-tie inverter includes the booster circuit. The booster circuit is arranged on the input side of the DC line capacitor 9 in Embodiment 6 or Embodiment 7. In the case where the booster circuit is arranged between the common mode choke coil 3 and the DC line capacitor 9, the leakage inductance of the common mode choke coil 3 can be allowed to function as a reactor of the booster circuit. The booster circuit boosts the output voltage of the solar cell 5, and sends the boosted output voltage to the inverter 1 via the DC line capacitor 9. The grid-tie inverter according to Embodiment 6 can suppress the resonance while suppressing the loss to the minimum also in the grid-tie inverter including the booster circuit.

Embodiment 7

Figure 16:
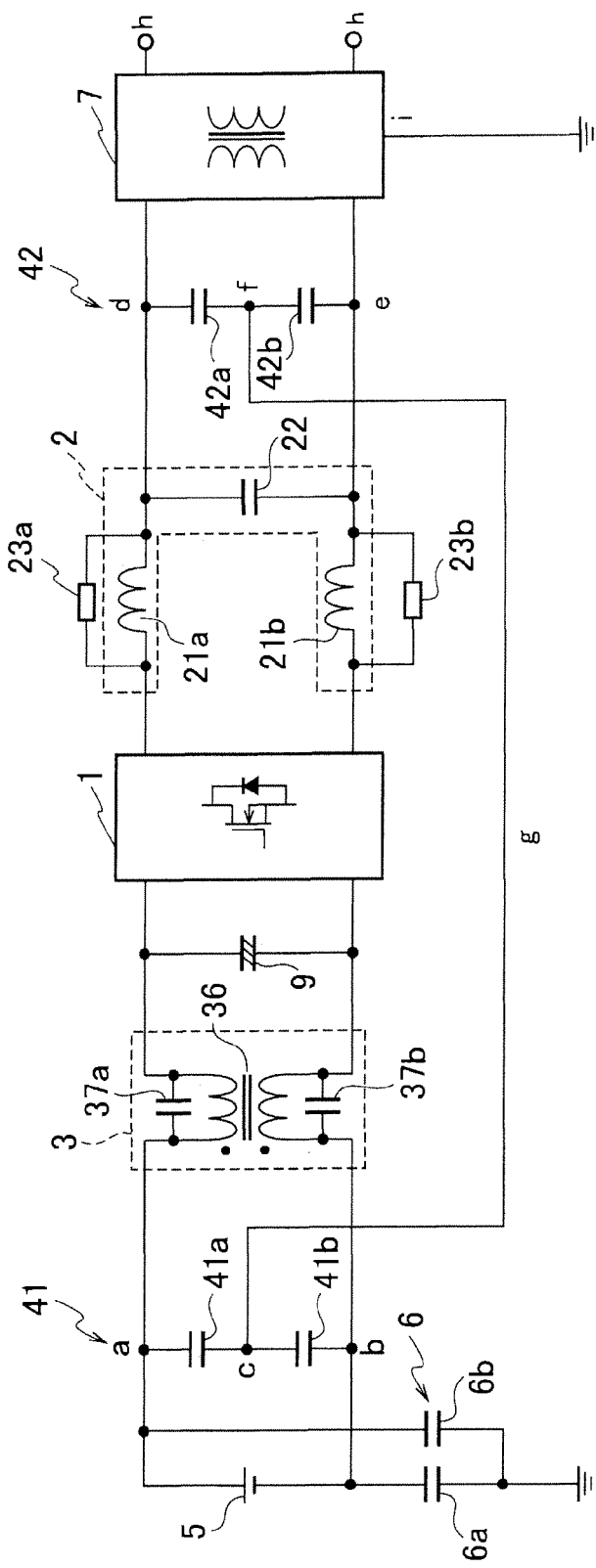
FIG. 16 is a block diagram illustrating a configuration of a grid-tie inverter according to Embodiment 7.

As illustrated in FIG. 16, a grid-tie inverter according to Embodiment 7 is composed in such a manner that the capacitors 24 and transformer 25 of the grid-tie inverter according to Embodiment 6 are removed, and that only the damping resistor 23 is connected in parallel to each of the first reactors 21.

In the case where loss of the damping resistor 23 is not regarded as a problem, only the damping resistor 23 illustrated in Embodiment 7 may be connected in parallel to each of the first reactors 21. In such a way, while suppressing the number of components to be small, the resonance that occurs between the inter-winding capacitances 37 of the common mode choke coil 3 and the first reactors 21 of the output filter 2 can be suppressed.

Moreover, in a similar way to the grid-tie inverter according to Embodiment 6, also in the grid-tie inverter according to Embodiment 7, the common mode choke coil 3 may be arranged on the output side of the inverter 1, or a plurality thereof may be arranged on both of the input side and output side of the inverter 1. Furthermore, in place of the first reactors 21 of the output filter 2, the reactor 26 illustrated in FIG. 14(*b*) may be used. Moreover, the grid-tie inverter according to Embodiment 7 can also be modified to a three-phase grid-tie inverter, and further, can also be modified to a grid-tie inverter including the booster circuit.

Embodiment 8

Figure 17:
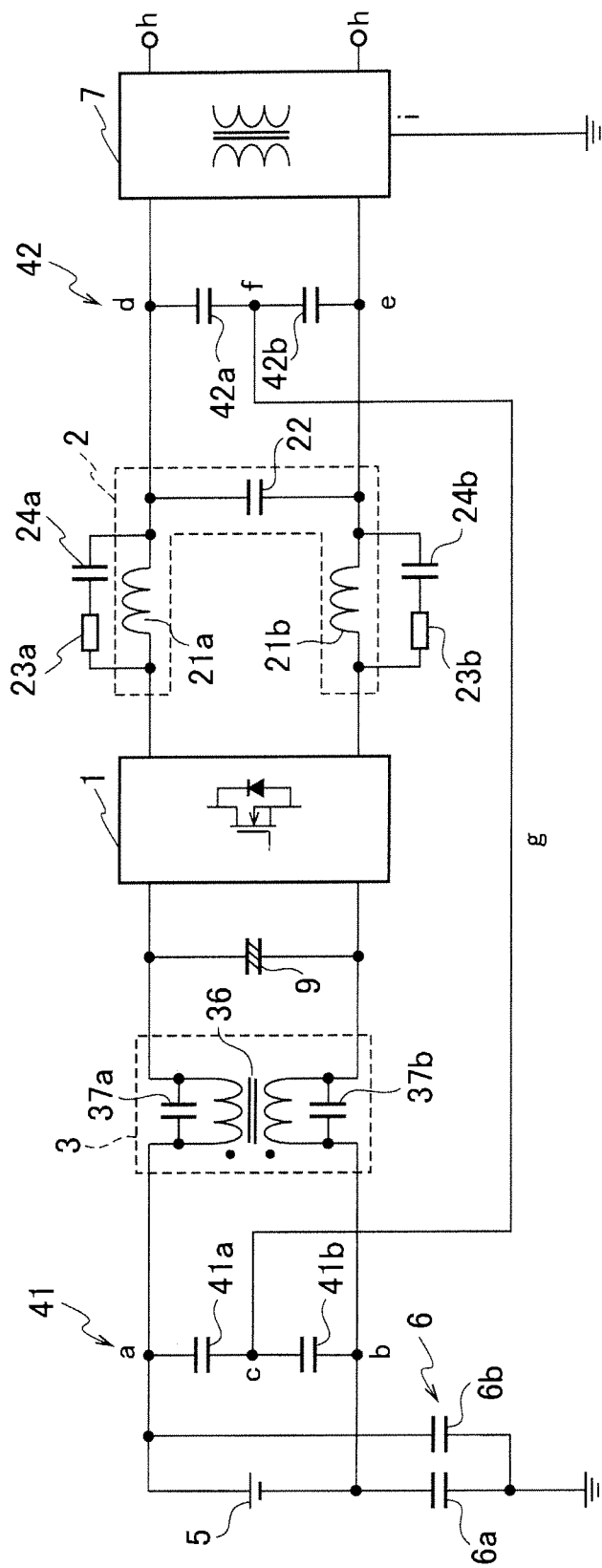
FIG. 17 is a block diagram illustrating a configuration of a grid-tie inverter according to Embodiment 8.

As illustrated in FIG. 17, a grid-tie inverter according to Embodiment 8 is composed in such a manner that the transformer 25 of the grid-tie inverter according to Embodiment 6 is removed, and that each series circuit of the damping resistor 23 and the capacitor 24 is connected in parallel to each of the first reactors 21.

In the case where loss in the damping resistor 23 owing to the normal mode current is not regarded as a problem, only the damping resistor 23 and the capacitor 24, which are illustrated in Embodiment 8, may be connected in parallel to each of the first reactor 21. In such a way, while suppressing the number of components to be small, the resonance that occurs between the inter-winding capacitances 37 of the common mode choke coil 3 and the first reactors 21 of the output filter 2 can be suppressed.

Moreover, in a similar way to the grid-tie inverter according to Embodiment 6 or Embodiment 7, also in the grid-tie inverter according to Embodiment 8, the common mode choke coil 3 may be arranged on the output side of the inverter 1, or a plurality thereof may be arranged on both of the input side and output side of the inverter 1. Furthermore, in place of the first reactors 21 of the output filter 2, the reactor 26 illustrated in FIG. 14(*b*) may be used. Moreover, the grid-tie inverter according to Embodiment 8 can also be modified to a three-phase grid-tie inverter, and further, can also be modified to a grid-tie inverter including the booster circuit.

Embodiment 9

Figure 18:
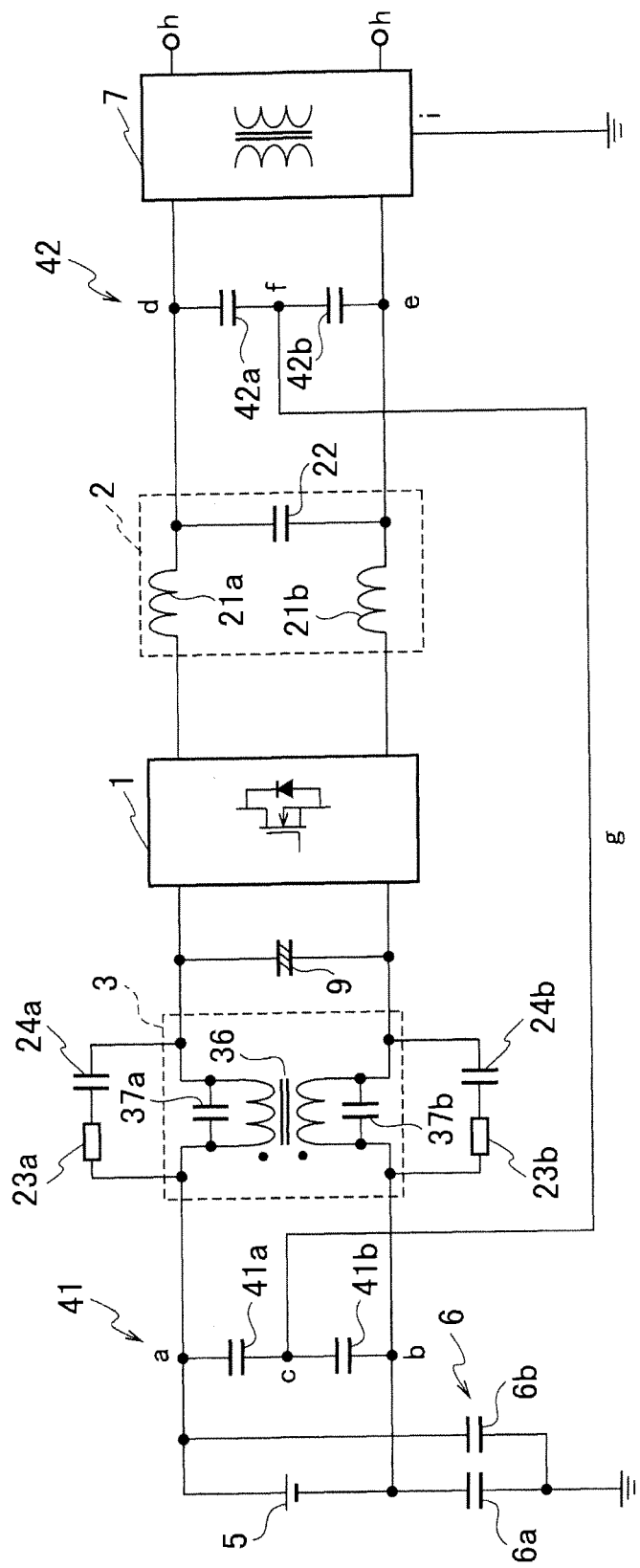
FIG. 18 is a block diagram illustrating a configuration of a grid-tie inverter according to Embodiment 9.

As illustrated in FIG. 18, a grid-tie inverter according to Embodiment 9 is composed in such a manner that the series circuit of the damping resistor 23 and capacitor 24 of the grid-tie inverter according to Embodiment 8 is connected in parallel not to each of the first reactor 21 but to each phase of the common mode choke coil 3.

The resonance occurs between the inter-winding capacitances 37 of the common mode choke coil 3 and the first reactors 21 of the output filter 2. Therefore, even if the damping resistor 23 is connected in parallel to each phase of the common mode choke coil 3, the resonance that occurs between the inter-winding capacitances 37 of the common mode choke coil 3 and the first reactors 21 of the output filter 2 can be suppressed.

In FIG. 18, an example has been illustrated, where the series circuit of the damping resistor 23 and the capacitor 24 is connected in parallel to each phase of the common mode choke coil 3. However, in a similar way to the grid-tie inverter according to Embodiment 6, which is illustrated in FIG. 12, such a configuration may be adopted so that only the common mode current can flow through the damping resistors 23 by adding a transformer 25 to the series circuits of the damping resistor 23 and the capacitor 24. In the case where the winding resistance of the transformer 25 sufficiently functions as the decay component that suppresses the resonance, the damping resistances 23 can be removed.

Moreover, in a similar way to the grid-tie inverter according to Embodiment 7, only the damping resistor 23 may be connected in parallel to each phase of the common mode choke coil 3.

Furthermore, in a similar way to the grid-tie inverter according to each of Embodiments 6 to 8, also in the grid-tie inverter according to Embodiment 9, the common mode choke coil 3 may be arranged on the output side of the inverter 1, or a plurality thereof may be arranged on both of the input side and output side of the inverter 1. Furthermore, in place of the first reactors 21 of the output filter 2, the reactor 26 illustrated in FIG. 14(*b*) may be used. Moreover, the grid-tie inverter according to Embodiment 9 can also be modified to a three-phase grid-tie inverter, and further, can also be modified to a grid-tie inverter including the booster circuit.

Embodiment 10

Figure 19:
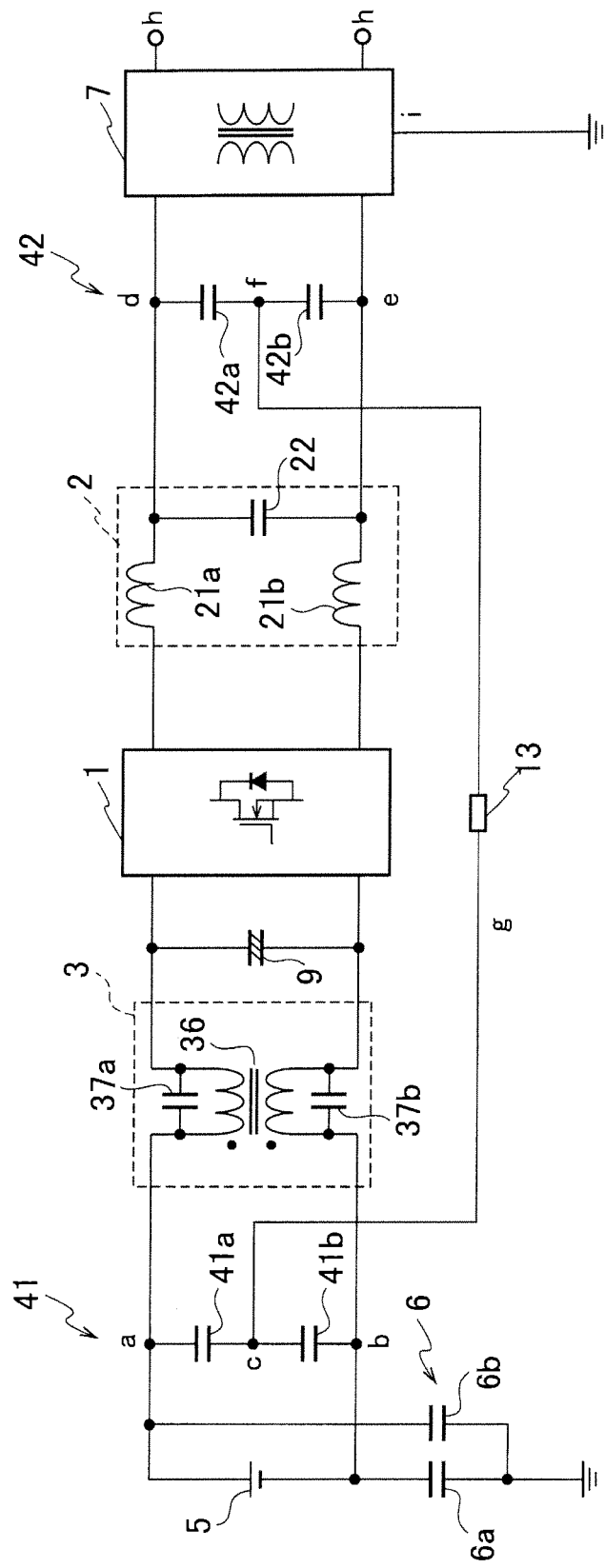
FIG. 19 is a block diagram illustrating a configuration of a grid-tie inverter according to Embodiment 10.

As illustrated in FIG. 19, a grid-tie inverter according to Embodiment 10 is composed in such a manner that the damping resistors 23 of the grid-tie inverter according to Embodiment 7 are removed, and that a damping resistor 13 (corresponding to the second resistor) is connected in series to the inside of the neutral point connecting line g.

The resonance occurs between the inter-winding capacitances 37 of the common mode choke coil 3 and the first reactors 21 of the output filter 2, and the resonance concerned passes through the neutral point connecting line g. Therefore, even if the damping resistor 13 is connected in series to the neutral point connecting line g, the resonance that occurs between the inter-winding capacitances 37 of the common mode choke coil 3 and the first reactors 21 of the output filter 2 can be suppressed.

Even if the damping resistor 13 is connected in series to the respective capacitors of the first capacitor pair 41 or the second capacitor pair 42 or both of the capacitor pairs, such connection is equivalent to that the damping resistor 13 is provided in the neutral point connecting line g.

Moreover, in a similar way to the grid-tie inverter according to each of Embodiments 6 to 9, also in the grid-tie inverter according to Embodiment 10, the common mode choke coil 3 may be arranged on the output side of the inverter 1, or a plurality thereof may be arranged on both of the input side and output side of the inverter 1. Furthermore, in place of the first reactors 21 of the output filter 2, the reactor 26 illustrated in FIG. 14(b) may be used. Moreover, the grid-tie inverter according to Embodiment 10 can also be modified to a three-phase grid-tie inverter, and further, can also be modified to a grid-tie inverter including the booster circuit.

Embodiment 11

Figure 20:
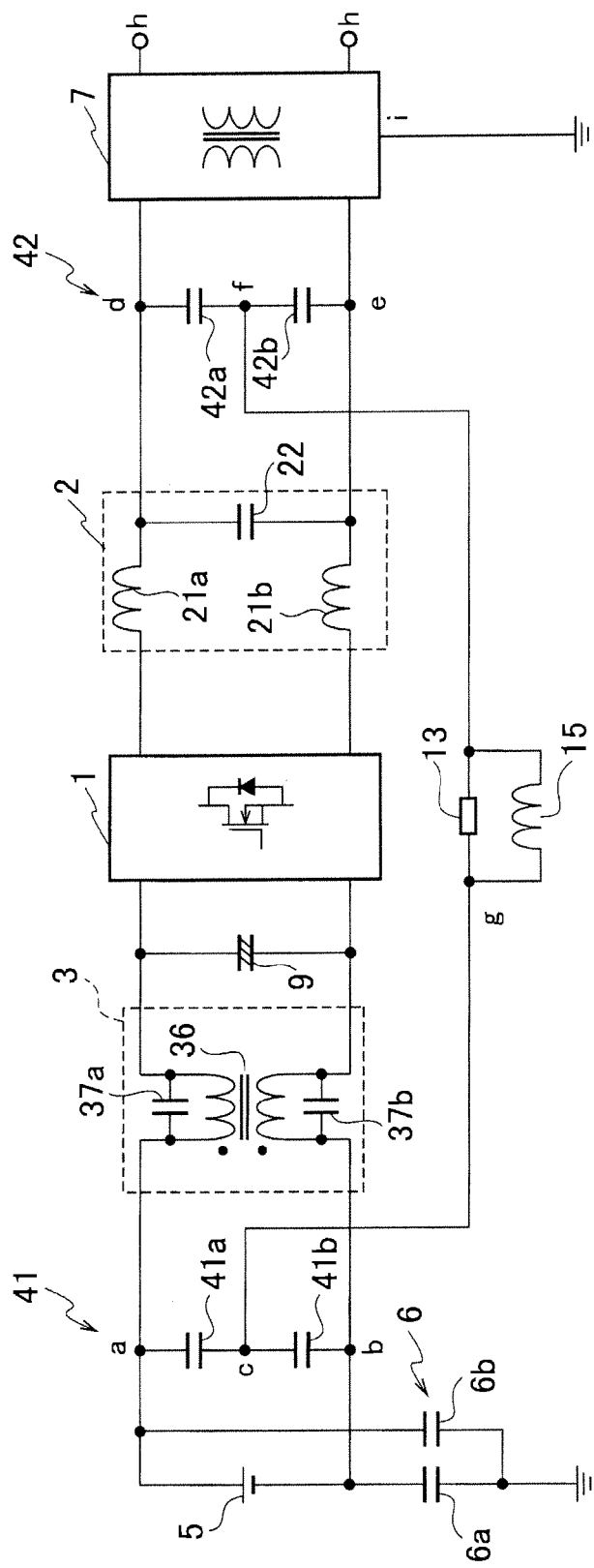
FIG. 20 is a block diagram illustrating a configuration of a grid-tie inverter according to Embodiment 11.

As illustrated in FIG. 20, a grid-tie inverter according to Embodiment 11 is composed in such a manner that a second reactor 15 is connected in parallel to the damping resistor 13 of the grid-tie inverter according to Embodiment 10.

When the damping resistor 13 is provided in the neutral point connecting line g, the damping resistor 13 functions as the decay component of the resonance; however, the impedance of the neutral point connecting line g is increased. Therefore, the function to bypass the high frequency common mode current is weakened.

However, when the second reactor 15 is connected in parallel to the damping resistor 13 provided in the neutral point connecting line g, the second reactor 15 exhibits low impedance for the low frequency, and has high impedance for the high frequency. Therefore, a magnitude of the impedance of the neutral point connecting line g can be changed depending on the frequency.

A main frequency of the high frequency common mode current that passes through the neutral point connecting line g is the switching frequency of the inverter 1. In the case where the switching frequency of the inverter 1 is lower than the frequency of the resonance that occurs between the inter-winding capacitances 37 of the common mode choke coil 3 and the first reactors 21 of the output filter 2, then at the switching frequency, most of the common mode current that passes through the neutral point connecting line g flows through the second reactor 15 with low impedance. At the resonance frequency, the impedance of the second reactor 15 is high, and such a damping effect of the damping resistor 13 can be allowed to function for the resonance.

As described above, the second reactor 15 is connected in parallel to the clamping resistor 13 connected to the neutral point connecting line g, whereby the resonance that occurs between the inter-winding capacitances 37 of the common mode choke coil 3 and the first reactors 21 of the output filter 2 can be suppressed without largely damaging the bypass function of the high frequency common mode current.

Moreover, the configuration of Embodiment 10 by the damping resistor 13 in the neutral point connecting line g or the configuration of Embodiment 11 by the damping resistor 13 and the second reactor 15 can also be implemented by combining the configurations of Embodiments 6 to 9 with one another.

Furthermore, in a similar way to the grid-tie inverter according to each of Embodiments 6 to 10, also in the grid-tie inverter according to Embodiment 11, the common mode choke coil 3 may be arranged on the output side of the inverter 1, or a plurality thereof may be arranged on both of the input side and output side of the inverter 1. Furthermore, in place of the first reactors 21 of the output filter 2, the reactor 26 illustrated in FIG. 14(b) may be used. Moreover, the grid-tie inverter according to Embodiment 11 can also be modified to a three-phase grid-tie inverter, and further, can also be modified to a grid-tie inverter including the booster circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A grid-tie inverter comprising:
a single-phase or three-phase inverter that performs pulse width modulation for a DC voltage supplied from a DC power supply;
a first capacitor circuit connected to an input side of the inverter so as to form a neutral point;
a second capacitor circuit connected to an output side of the inverter so as to form a neutral point;
a common mode current bypass channel formed by connecting the neutral point of the first capacitor circuit and the neutral point of the second capacitor circuit to each other;
a grounded capacitor provided between the bypass channel and a ground;
a first common mode choke coil unit including a common mode choke coil at least one of between the first capacitor circuit and the inverter and between the inverter and the second capacitor circuit, the first common mode choke coil unit that suppresses a common mode current occurring in the inverter;
an output filter converting a pulse width-modulated voltage waveform outputted from the inverter into a sine single-phase or three-phase AC voltage, the output filter positioned between the inverter and the second capacitor circuit; and
a grid transformer connected to an output side of the second capacitor circuit, a neutral point of the grid transformer connected to the ground through a neutral ground line, wherein
at a switching frequency of the inverter, an impedance of the bypass channel is smaller than an impedance of a leakage current channel formed in which a leakage current flows through such a route that goes from the neutral point of the grid transformer to a stray capacitance of the DC power supply through the ground.

2. The grid-tie inverter according to claim 1, further comprising:
a second common mode choke coil unit including a common mode choke coil at least one of on a DC power supply side of the first capacitor circuit and on a grid side of the second capacitor circuit, the second common mode choke coil unit that suppresses propagation of a common mode noise.

3. The grid-tie inverter according to claim 1, further comprising:
a first resistor provided between the grounded capacitor and the ground, the first resistor that suppresses a resonance.

4. The grid-tie inverter according to claim 1, further comprising:
a second resistor provided on a way of the bypass channel, the second resistor that controls the resonance.

5. The grid-tie inverter according to claim 1, further comprising:
a reactor arranged between the output filter and the second capacitor circuit, the reactor composing an LC filter together with a capacitor composing the output filter or with the second capacitor circuit, the LC filter suppressing a normal mode harmonic noise.

6. The grid-tie inverter according to claim 2, wherein
the second common mode choke coil unit includes the common mode choke coil at least on the grid side of the second capacitor circuit, and
a capacitor arranged on a grid side of the common mode choke coil provided on the grid side of the second capacitor circuit composes an LC filter that suppresses a normal mode harmonic noise together with an inductance component of the common mode choke coil provided on the grid side of the second capacitor circuit.

7. A grid-tie inverter comprising:
a single-phase or three-phase inverter that performs pulse width modulation for a DC voltage supplied from a DC power supply;
a first capacitor circuit connected to an input side of the inverter;
a second capacitor circuit connected to an output side of the inverter;
a common mode current bypass channel formed by connecting one end of the first capacitor circuit and one end of the second capacitor circuit to each other, or connecting the one end of the first capacitor circuit and a neutral point of the second capacitor circuit, or connecting a neutral point of the first capacitor circuit and the one end of the second capacitor circuit;
a capacitor provided in the bypass channel;
a grounded capacitor provided between the bypass channel and a ground;
a first common mode choke coil unit including a common mode choke coil at least one between the first capacitor circuit and the inverter and between the inverter and the second capacitor circuit, the first common mode choke coil unit that suppresses a common mode current occurring in the inverter;
an output filter converting a pulse width-modulated voltage waveform outputted from the inverter into a sine single-phase or three-phase AC voltage, the output filter positioned between the inverter and the second capacitor circuit; and
a grid transformer connected to an output side of the second capacitor circuit, a neutral point of the grid transformer connected to the ground through a neutral ground line, wherein
at a switching frequency of the inverter, an impedance of the bypass channel is smaller than an impedance of a leakage current channel formed in which a leakage current flows through such a route that goes from the neutral point of the grid transformer to a stray capacitance of the DC power supply through the ground.

8. The grid-tie inverter according to claim 1, further comprising:
a booster circuit including a first switching element, the booster circuit boosting a DC voltage supplied from a DC power supply;
a second switching element provided in the inverter, the inverter performing three-level pulse width modulation for an output of the booster circuit; and
a control circuit that creates a gate control signal controlling ON/OFF switching of the first switching element provided in the booster circuit and the second switching element provided in the inverter, wherein
based on a carrier with a predetermined frequency and on a waveform in which a phase of the carrier is adjusted, the control unit creates the gate control signal for controlling variations of a neutral point potential that occurs following the switching of the first switching element provided in the booster circuit and variations of a neutral point potential that occurs following the switching of the second switching element provided in the inverter so that frequencies and phases of both of the variations can coincide with each other.

9. A grid-tie inverter comprising;
a single-phase or three-phase inverter that performs pulse width modulation for a DC voltage supplied from a DC power supply;
a first capacitor circuit connected to an input side of the inverter so as to form a neutral point;
a second capacitor circuit connected to an output side of the inverter so as to form a neutral point;
a common mode current bypass channel formed by connecting the neutral point of the first capacitor circuit and the neutral point of the second capacitor circuit to each other;
a first common mode choke coil unit including a common mode choke coil at least one of between the first capacitor circuit and the inverter and between the inverter and the second capacitor circuit, the first common mode choke coil unit that suppresses a common mode current occurring in the inverter;
an output filter converting a pulse width-modulated voltage waveform outputted from the inverter into a sine single-phase or three-phase AC voltage, the output filter composed of first reactors and a first capacitor, the output filter positioned between the inverter and the second capacitor circuit;
a resonance suppression circuit that suppresses a resonance occurring between inter-winding capacitance of the common mode choke coil and the first reactor of the output filter; and
a grid transformer connected to an output side of the second capacitor circuit, a neutral point of the grid transformer connected to the ground through a neutral ground line, wherein
at a switching frequency of the inverter, an impedance of the bypass channel is smaller than an impedance of a leakage current channel formed in which a leakage current flows through such a route that goes from the neutral point of the grid transformer to a stray capacitance of the DC power supply through the ground.

10. The grid-tie inverter according to claim 9, wherein
the resonance suppression circuit includes resistors each connected in parallel to respective-phase first reactors of the output filter.

11. The grid-tie inverter according to claim 9, wherein
the resonance suppression circuit includes series circuits each composed of a resistor and a second capacitor, each of the series circuits connected in parallel to respective-phase first reactors of the output filter.

12. The grid-tie inverter according to claim 9, further comprising:
a resistor connected in parallel to a winding of the common mode choke coil.

13. The grid-tie inverter according to claim 9, wherein
the resonance suppression circuit includes a series circuit composed of a resistor and a second capacitor, the series circuit connected in parallel to windings of the common mode choke coil.

14. The grid-tie inverter according to claim 9, wherein
the resonance suppression circuit includes windings connected in series to routes of components connected in parallel to respective-phase first reactors of the output filter, and
the resonance suppression circuit is composed in a manner that the winding of one phase and the winding of the other one phase are magnetically coupled to each other so as to have low impedance for a common mode and to have high impedance for a normal mode.

15. The grid-tie inverter according to claim 9, wherein the resonance suppression circuit includes a resistor in the common mode current bypass channel.

16. The grid-tie inverter according to claim 15, wherein the resonance suppression circuit includes a second reactor connected in parallel to the resistor provided in the common mode current bypass channel.

* * * * *